Feb. 6, 1962 F. SLAMAR ET AL 3,019,577
PACKAGING LINE
Filed Sept. 9, 1958 25 Sheets-Sheet 6
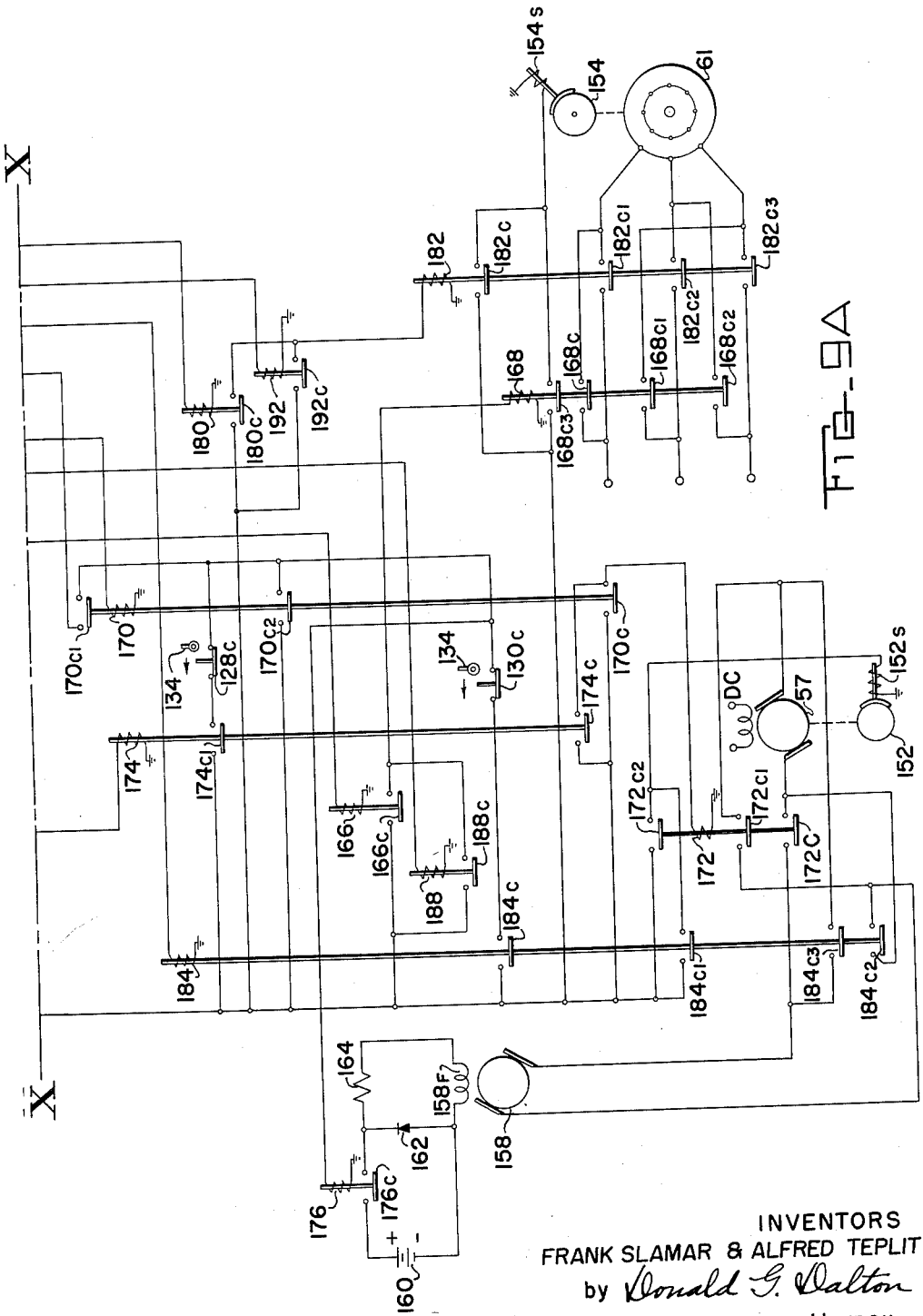
FIG_9A
INVENTORS
FRANK SLAMAR & ALFRED TEPLITZ
by Donald G. Dalton
attorney

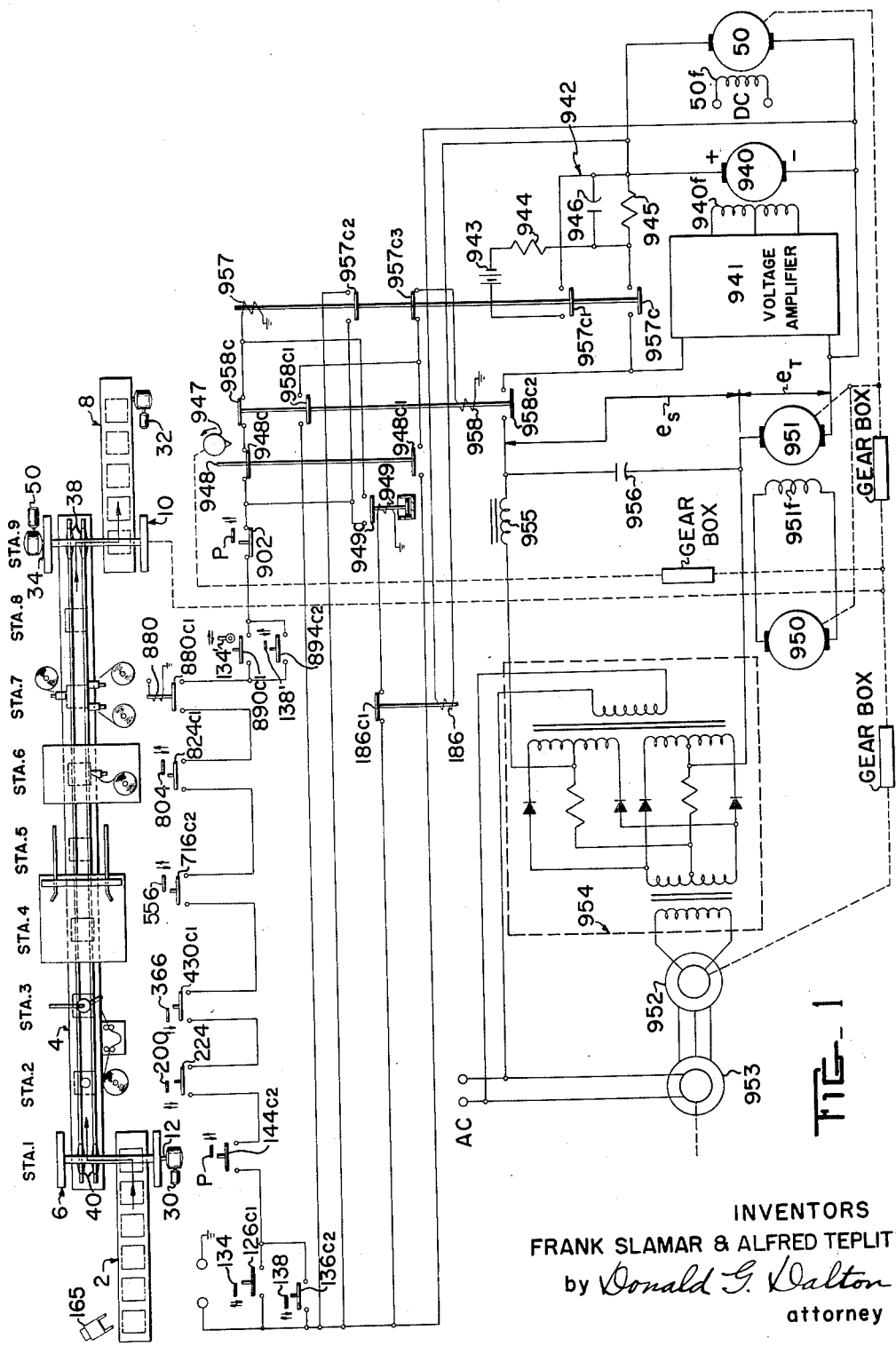

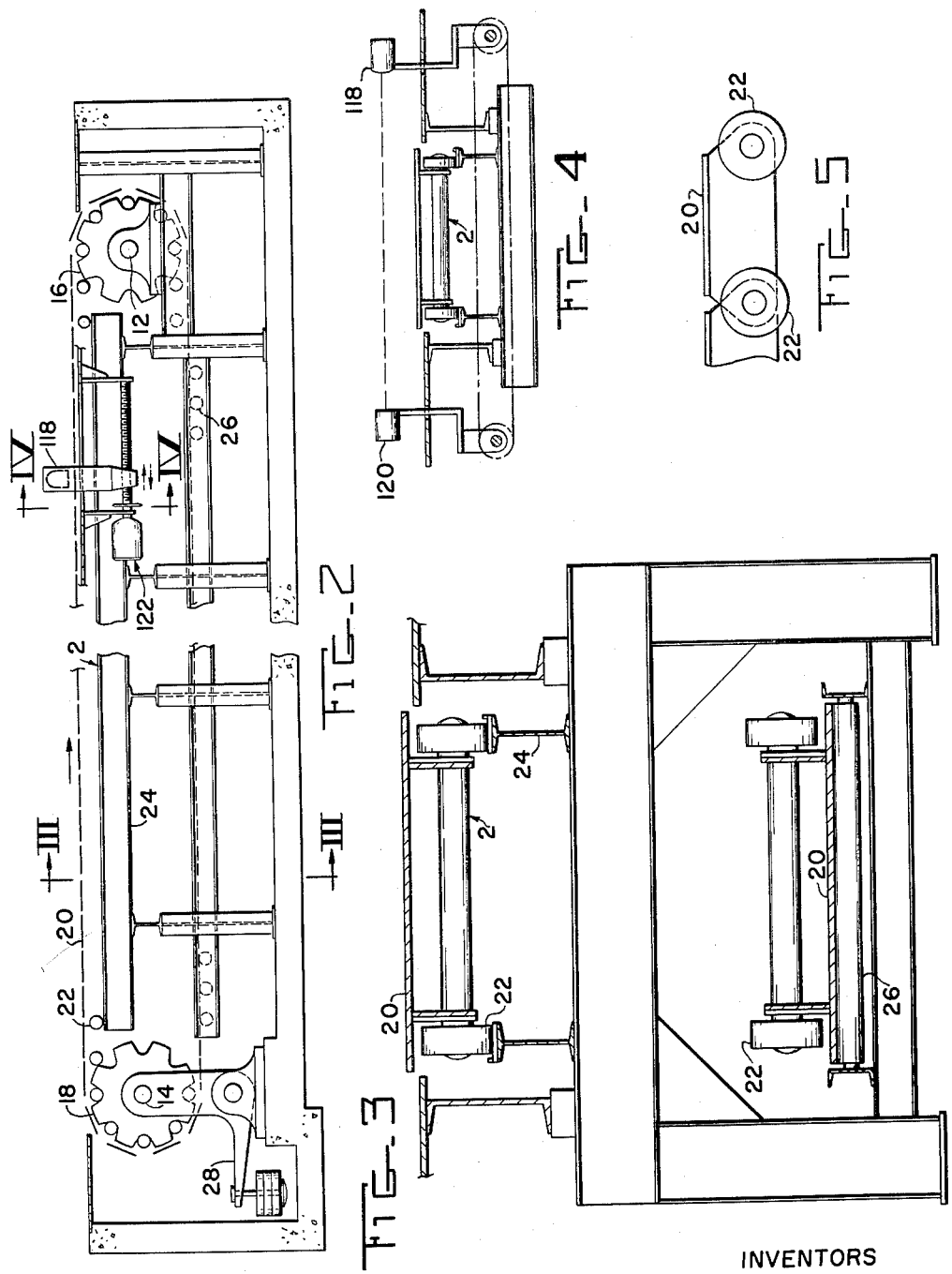

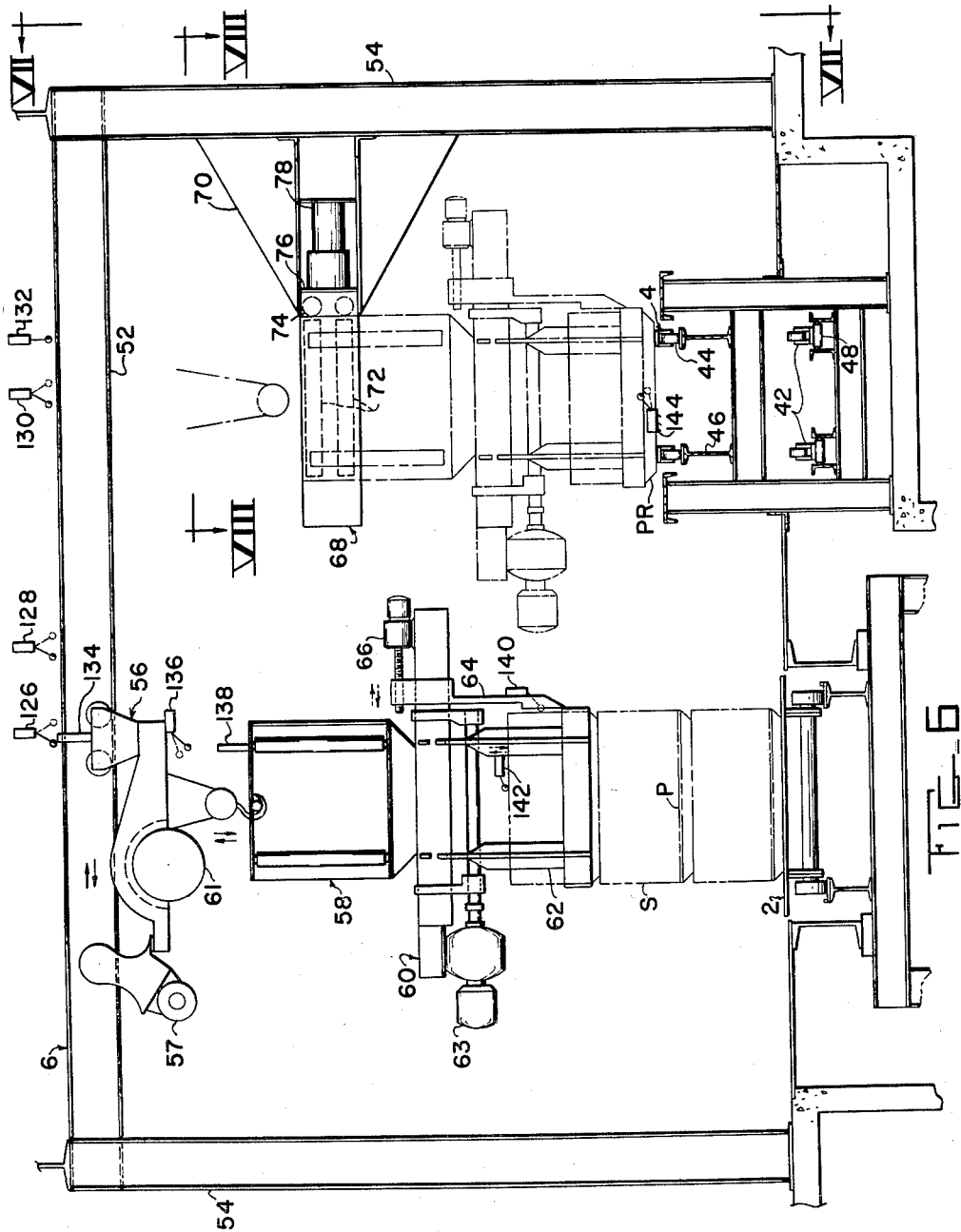

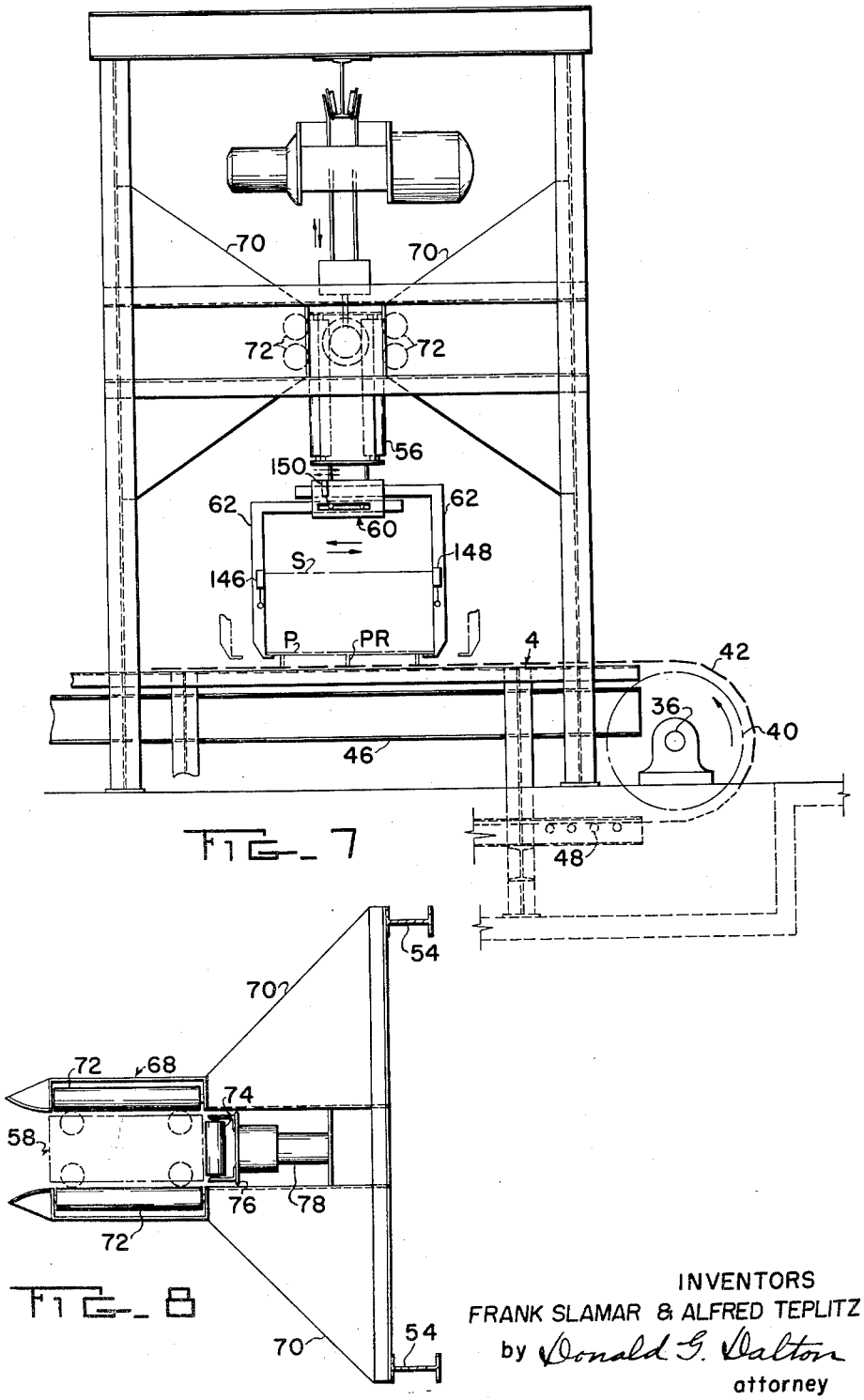

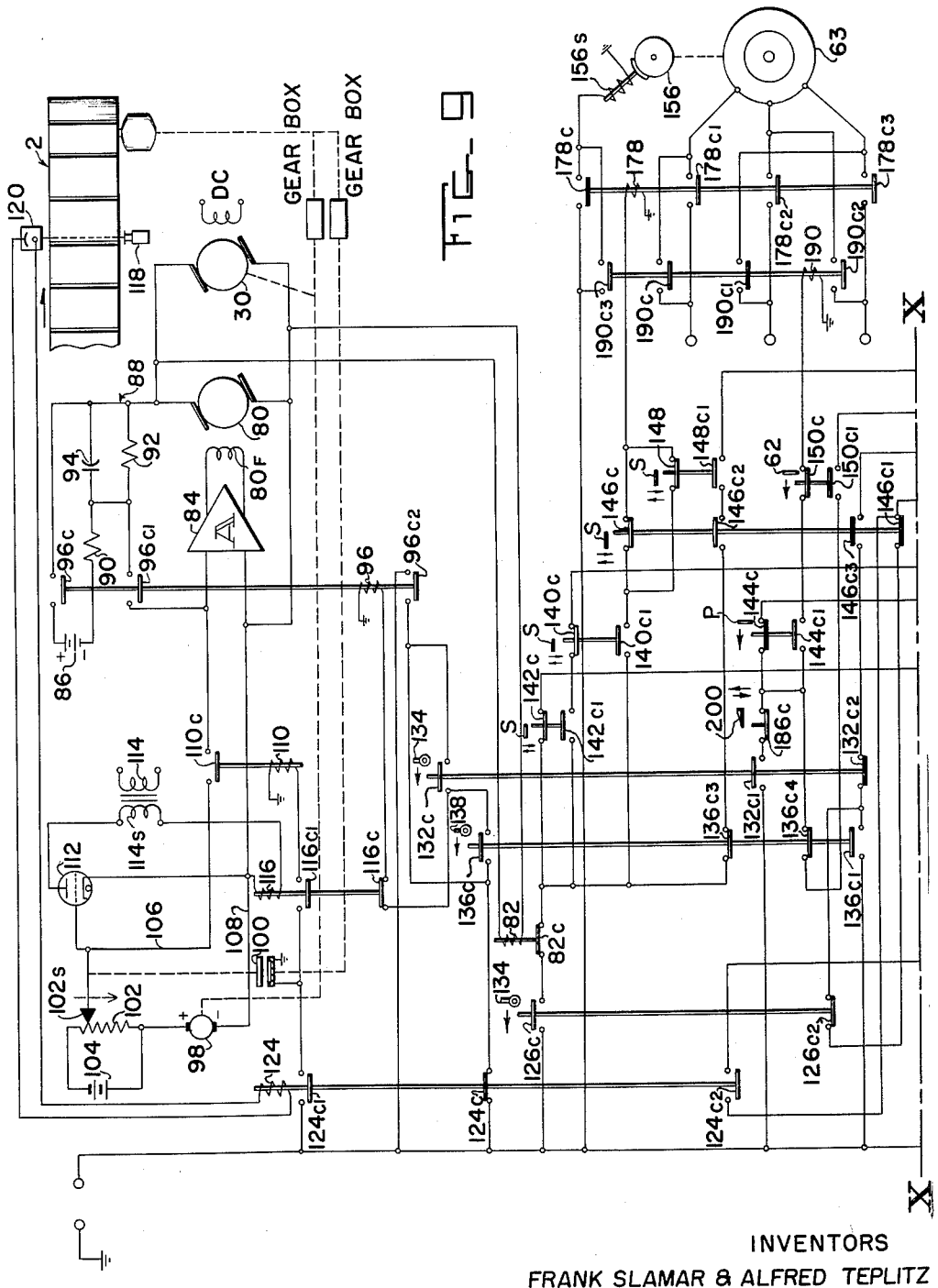

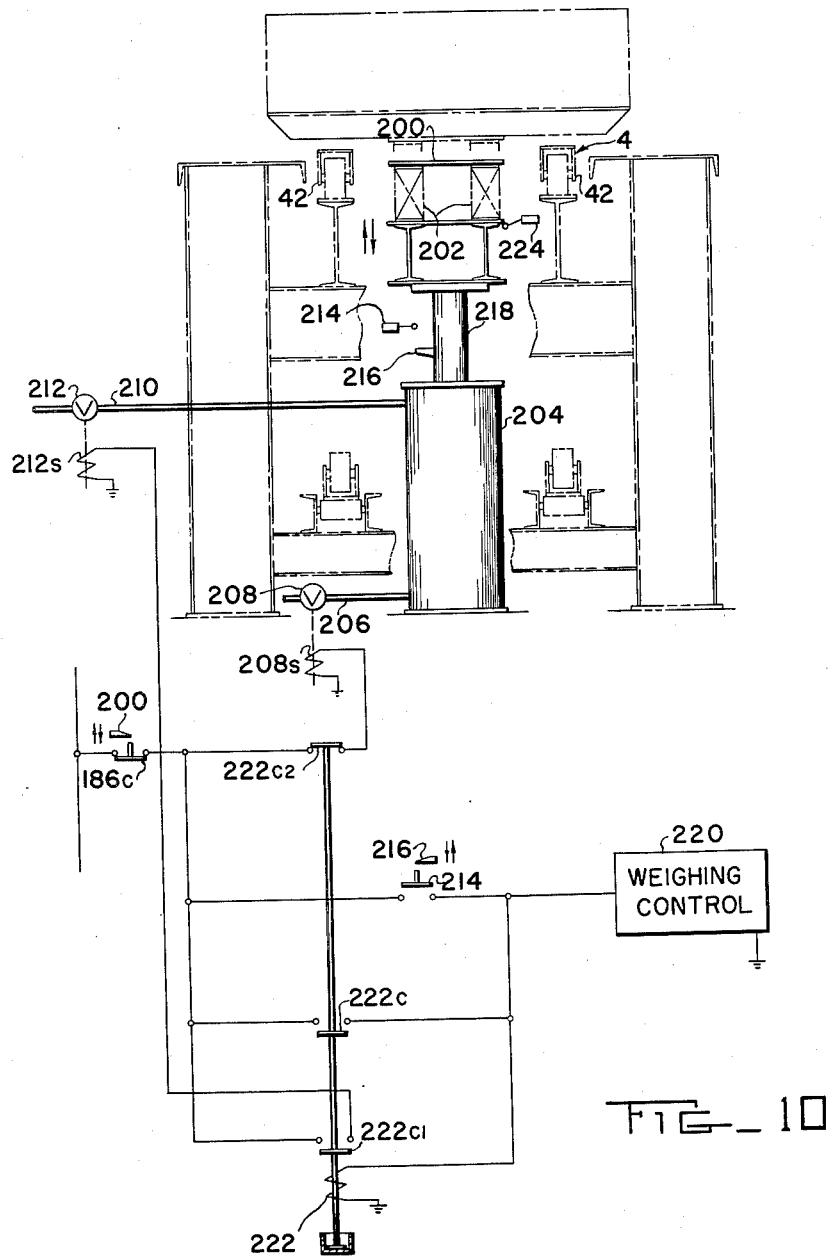

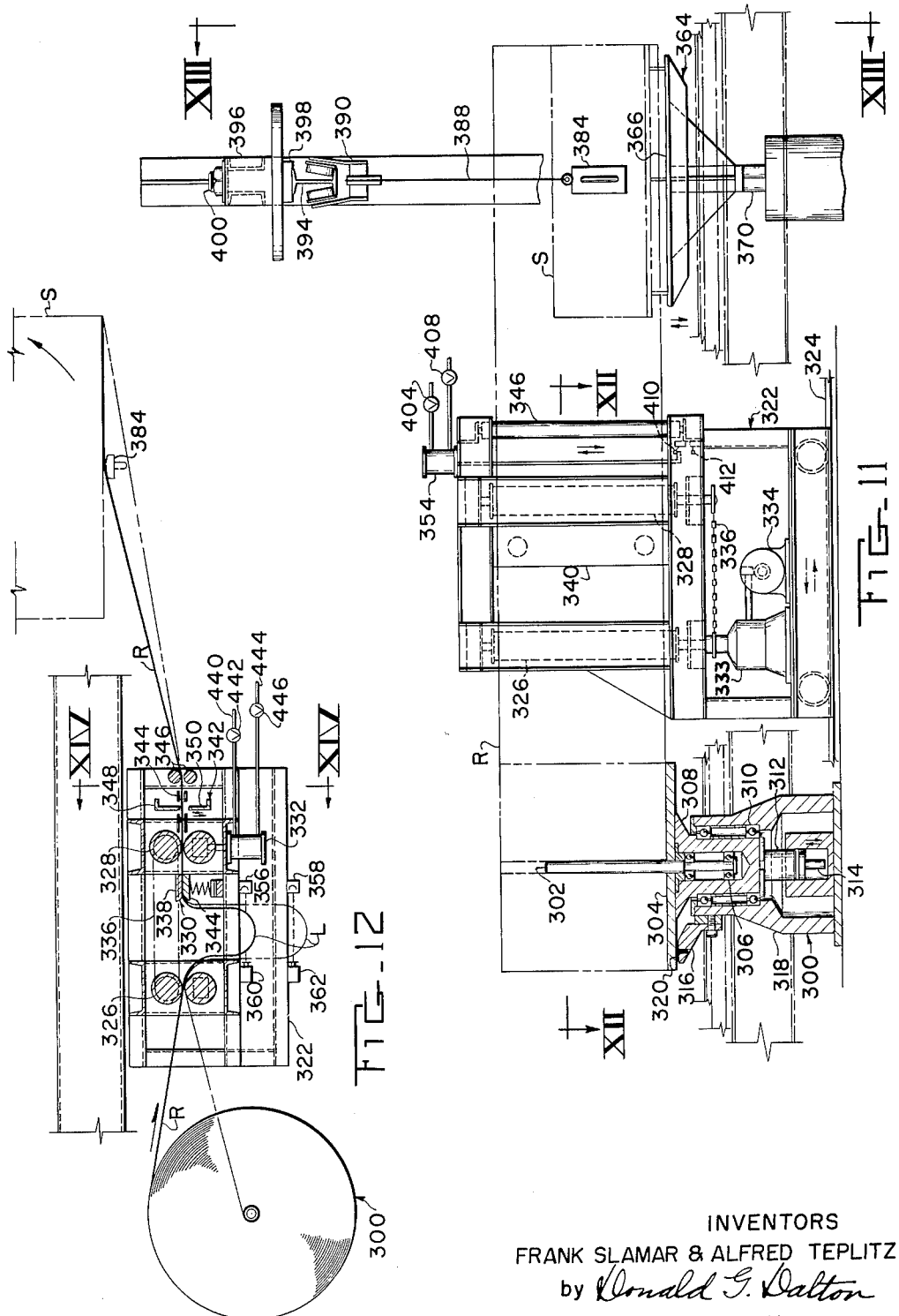

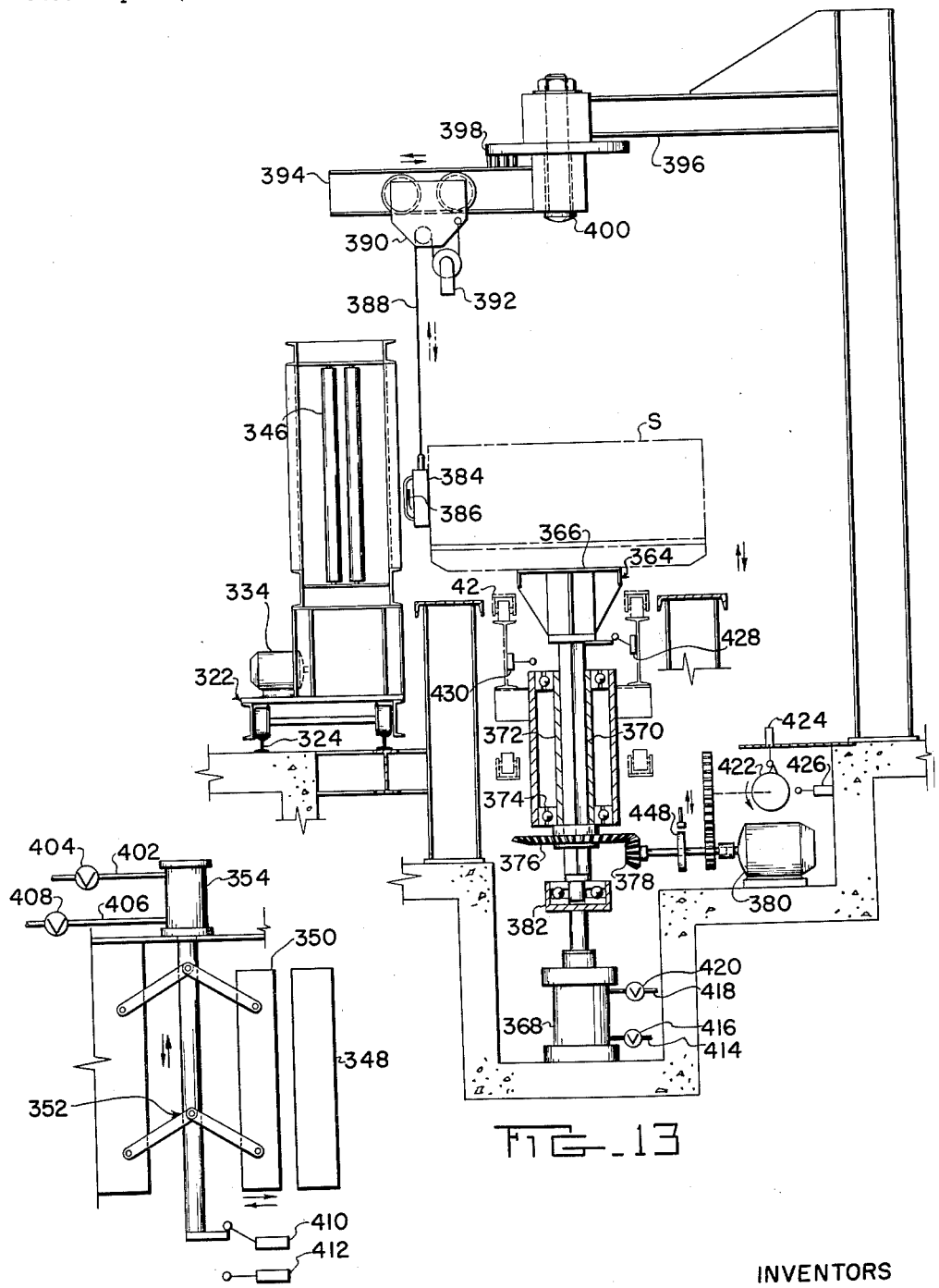

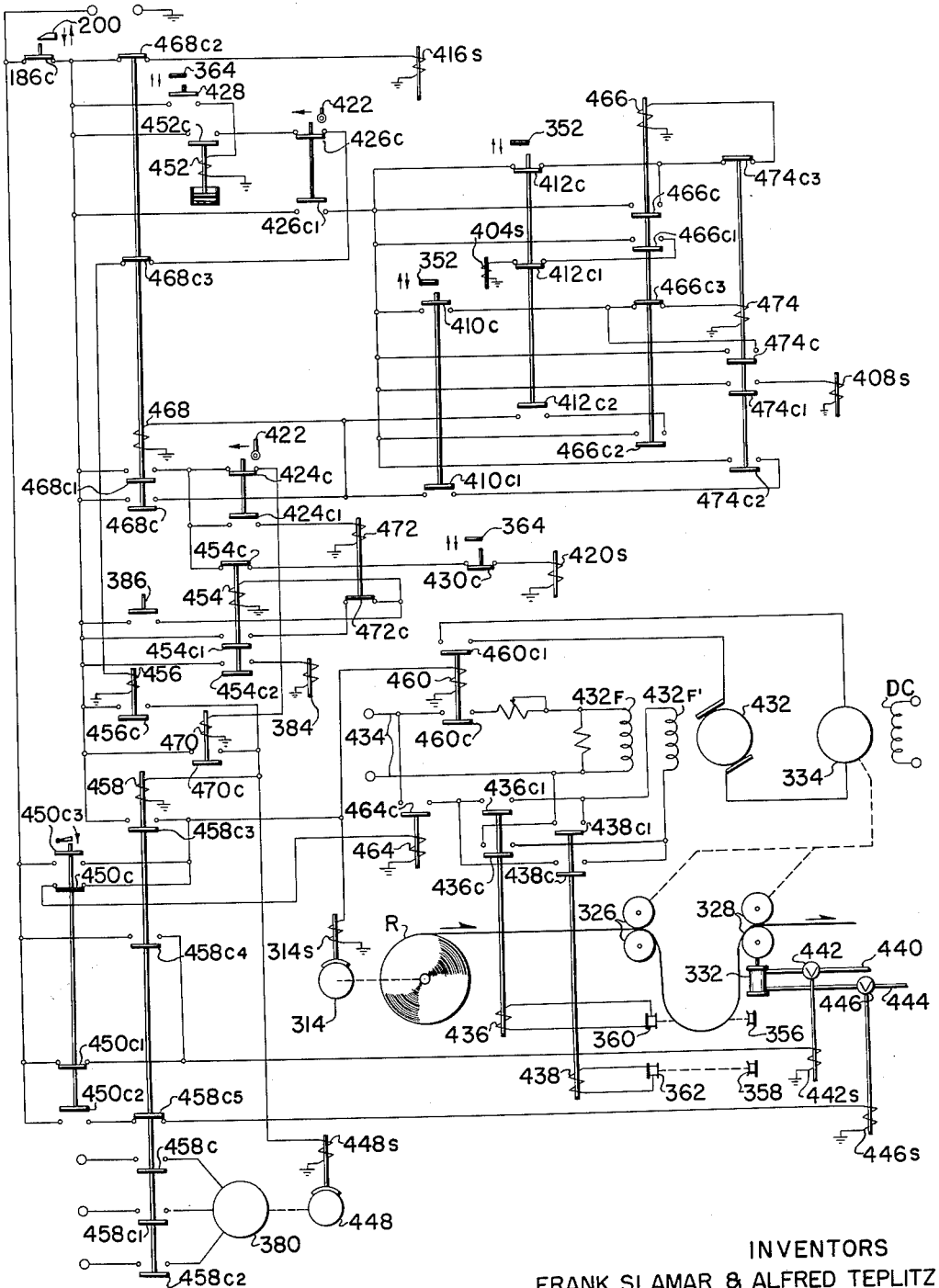

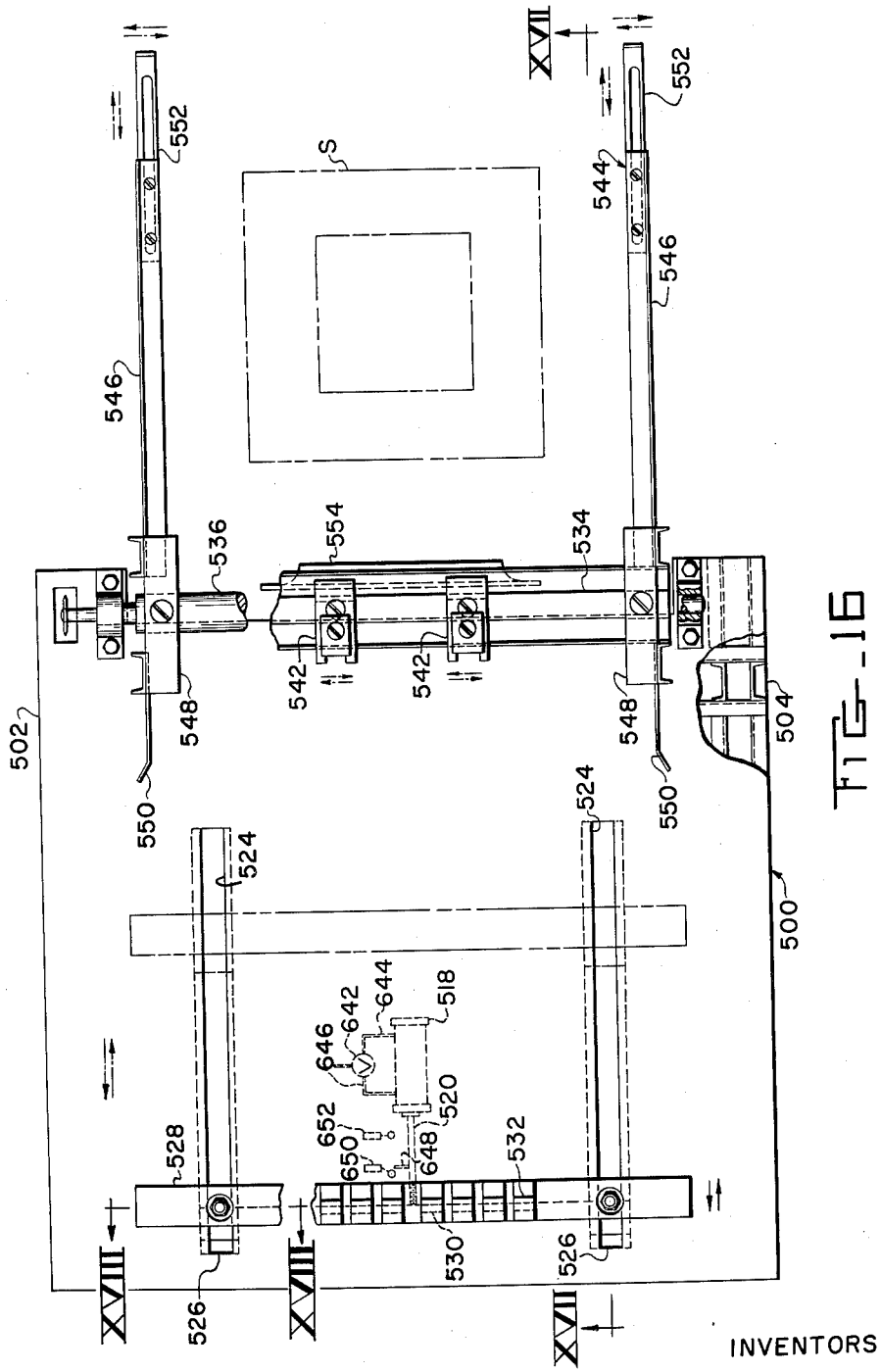

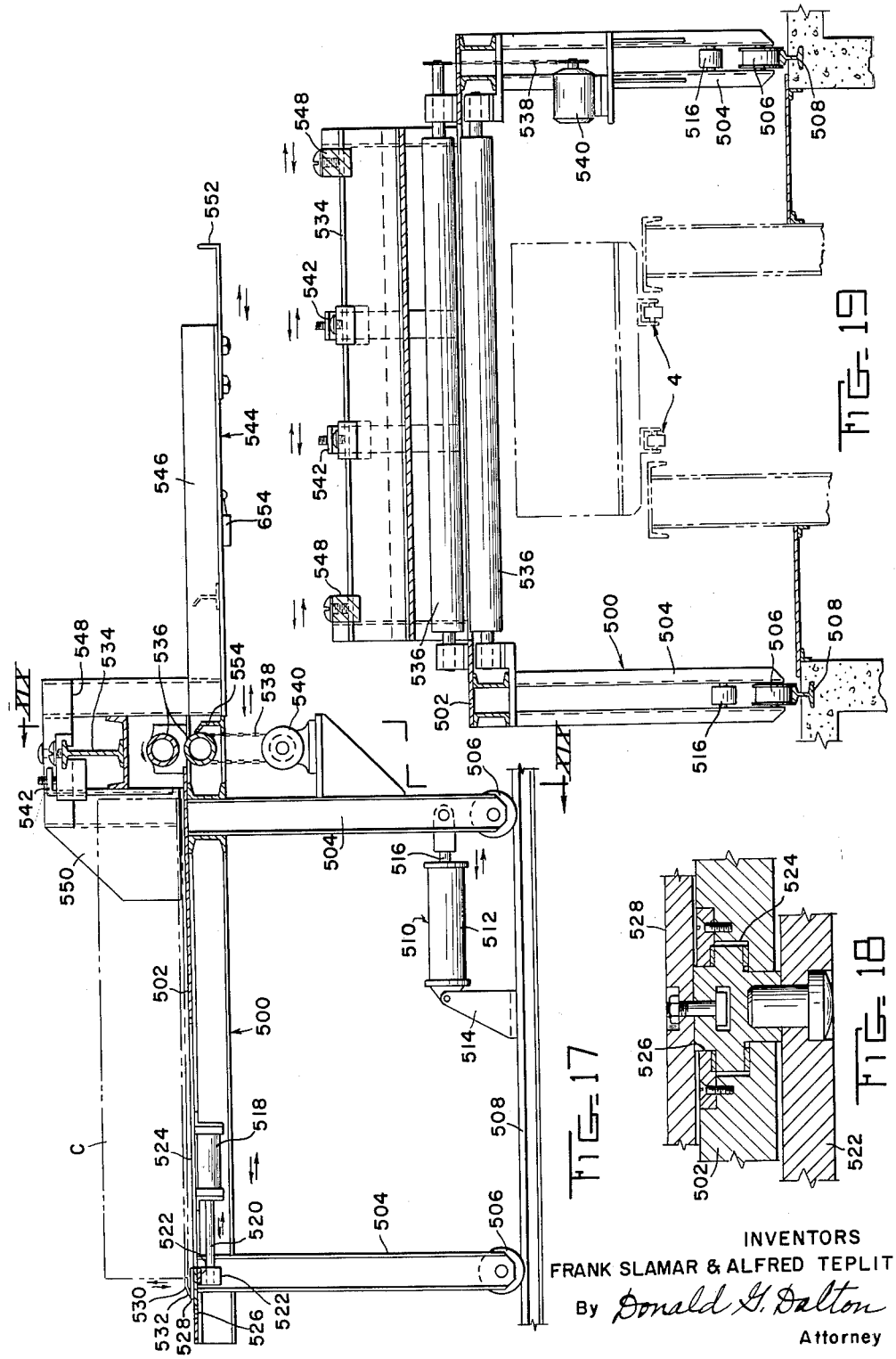

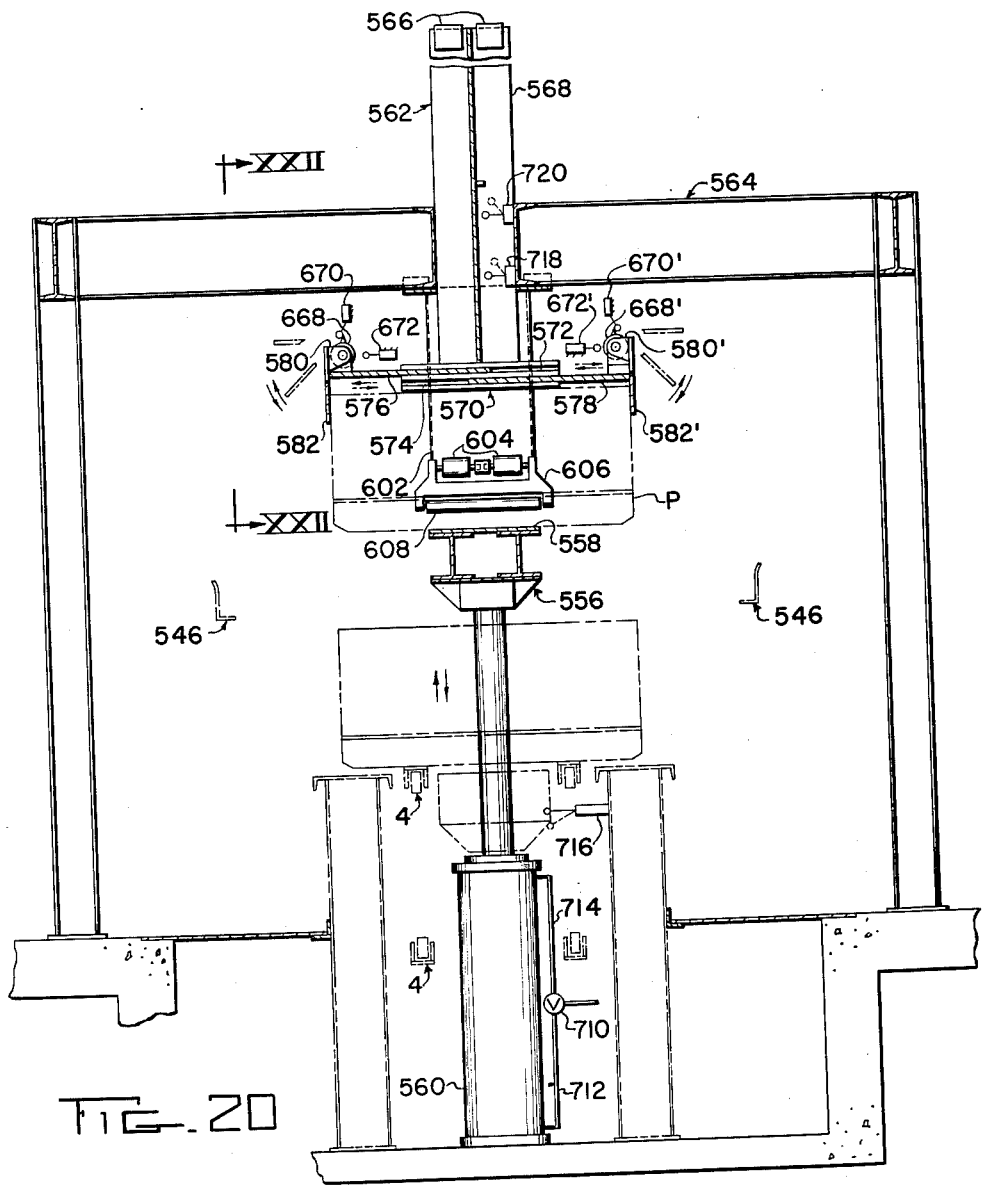
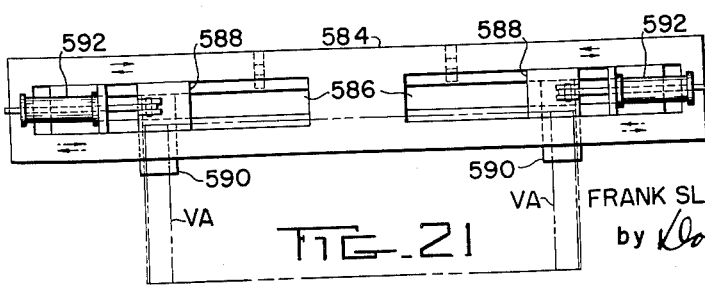

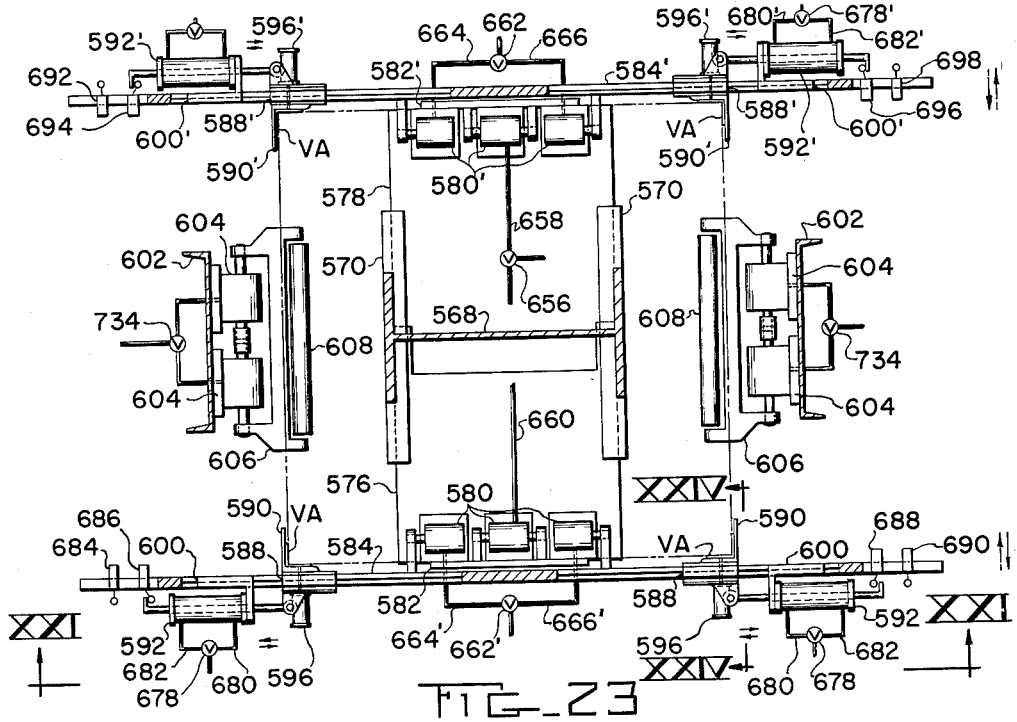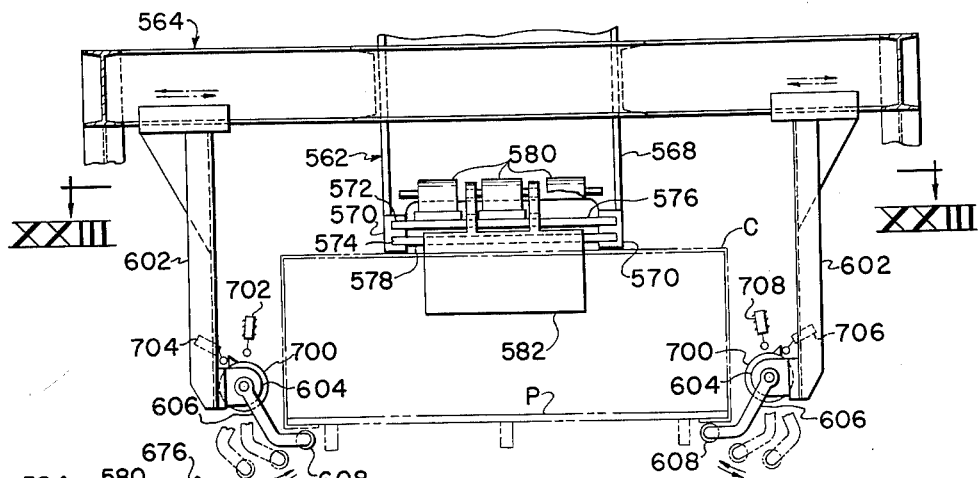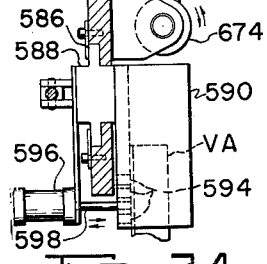

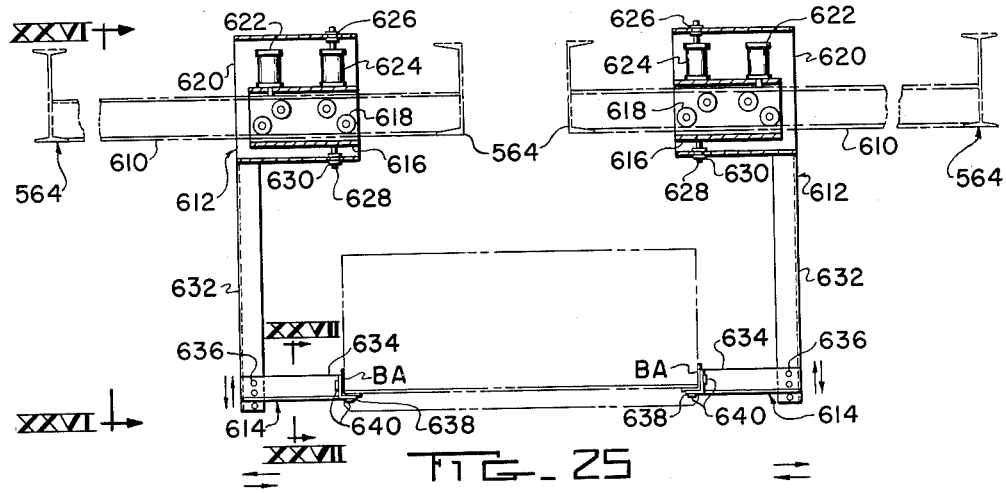
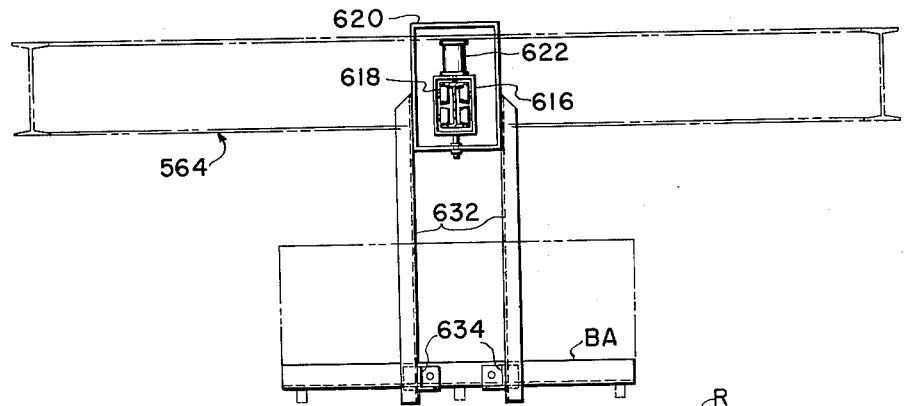
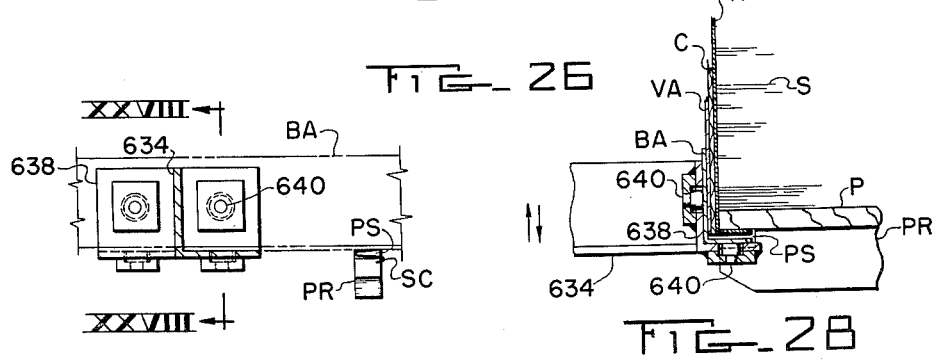
INVENTORS
FRANK SLAMAR & ALFRED TEPLITZ
by Donald G. Dalton
attorney Feb. 6, 1962   F. SLAMAR ET AL   3,019,577
PACKAGING LINE
Filed Sept. 9, 1958   25 Sheets-Sheet 16

INVENTORS
FRANK SLAMAR & ALFRED TEPLITZ
by Donald G. Dalton
attorney

INVENTORS
FRANK SLAMAR & ALFRED TEPLITZ
by Donald G. Dalton
attorney

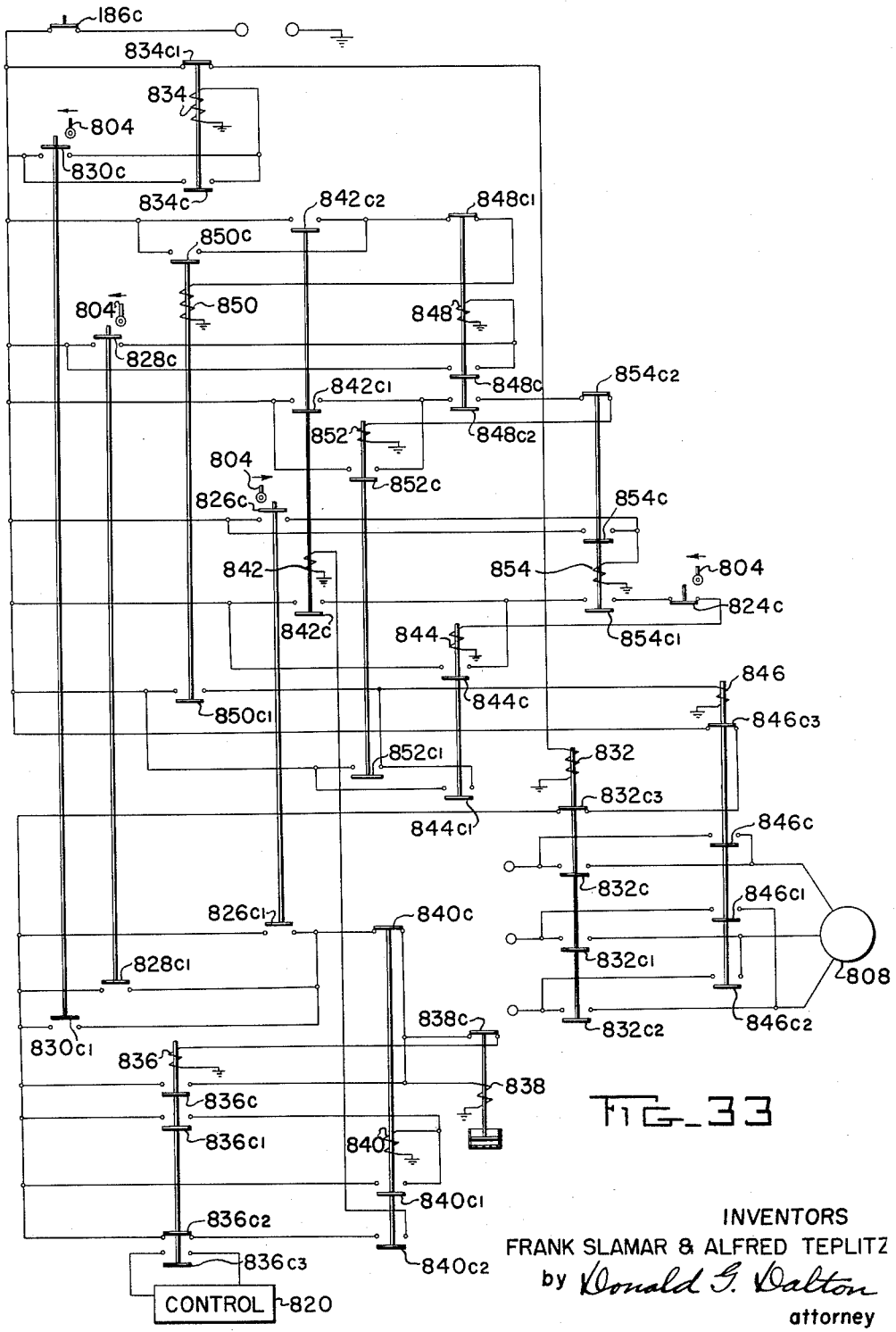
FIG_33

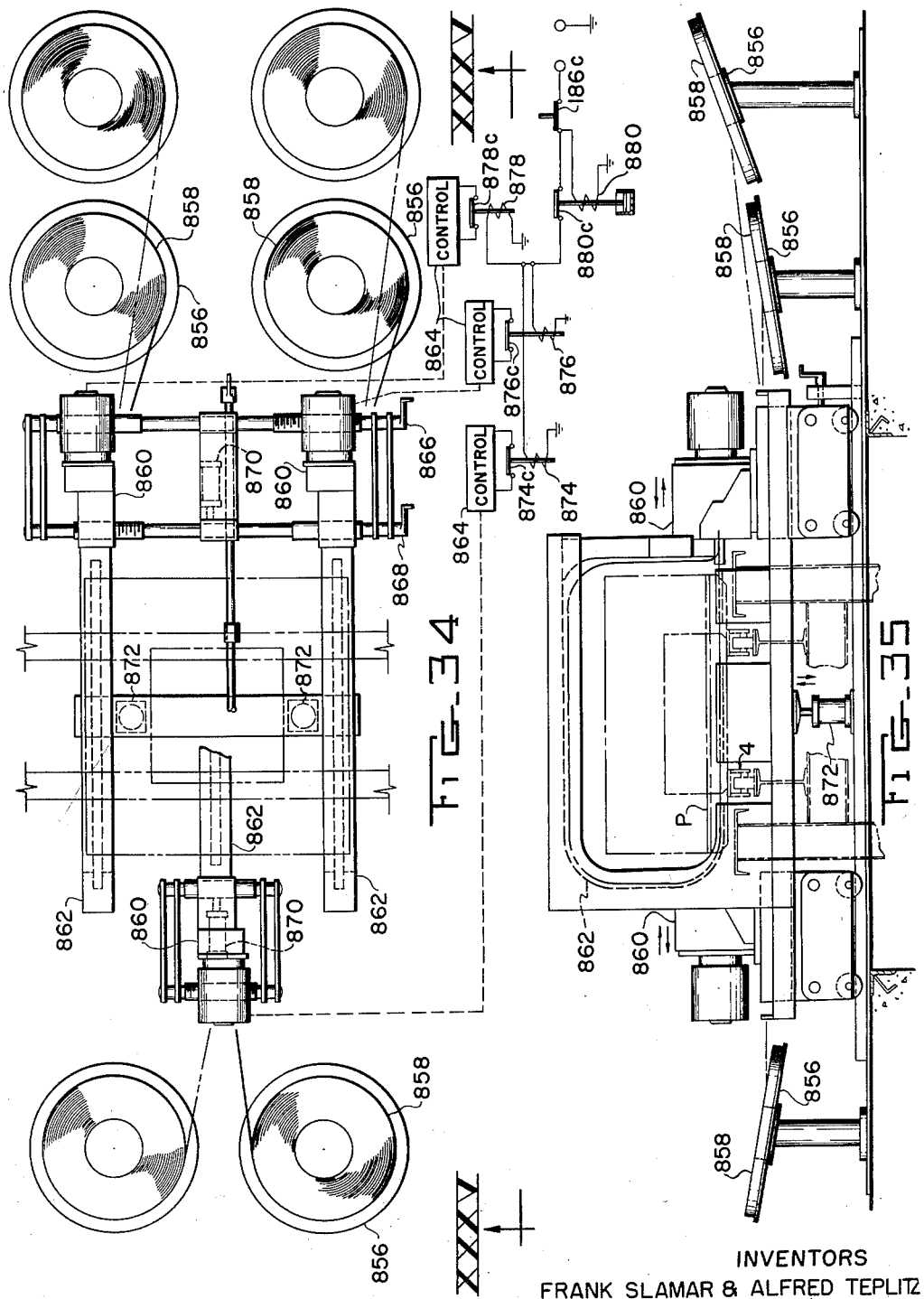

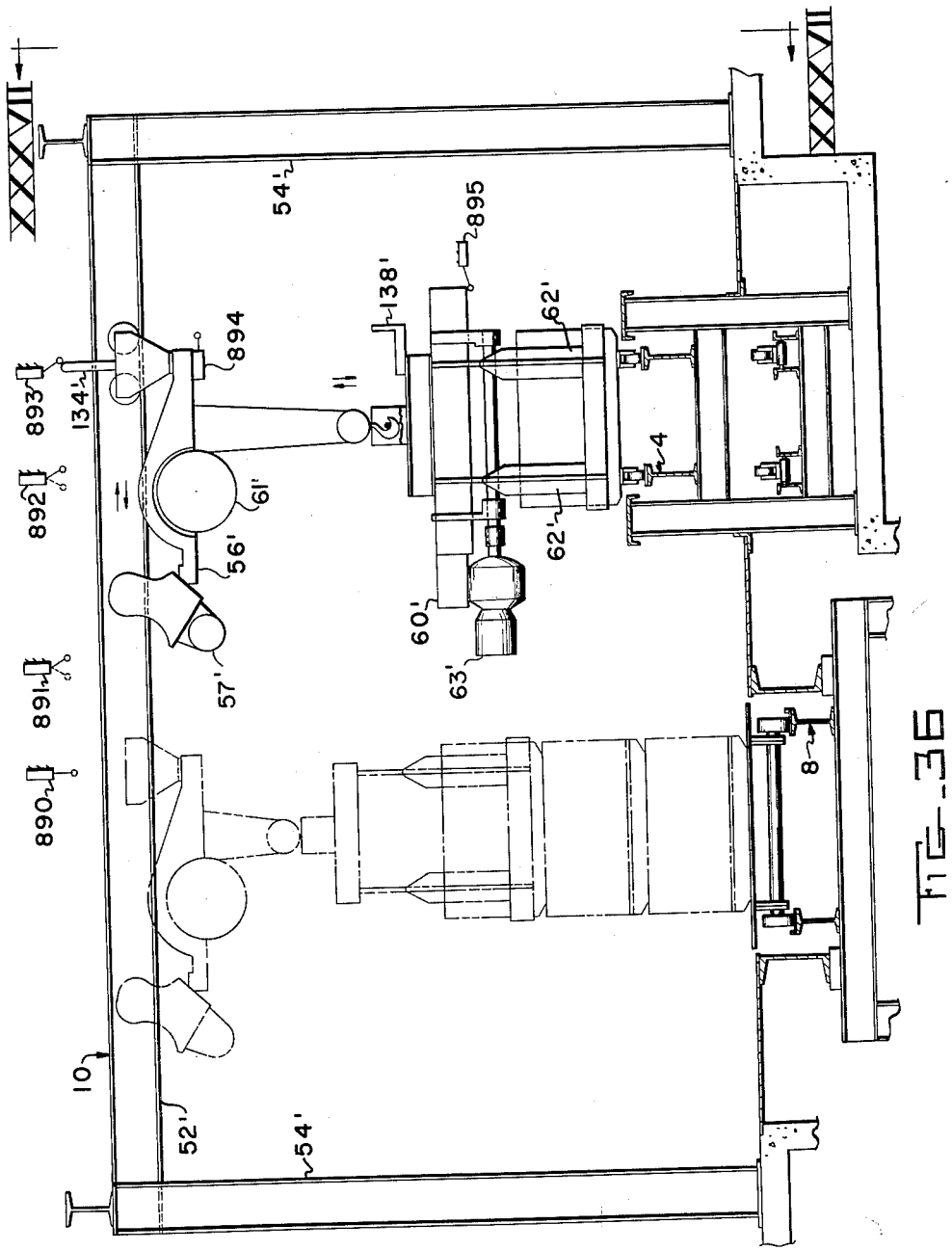

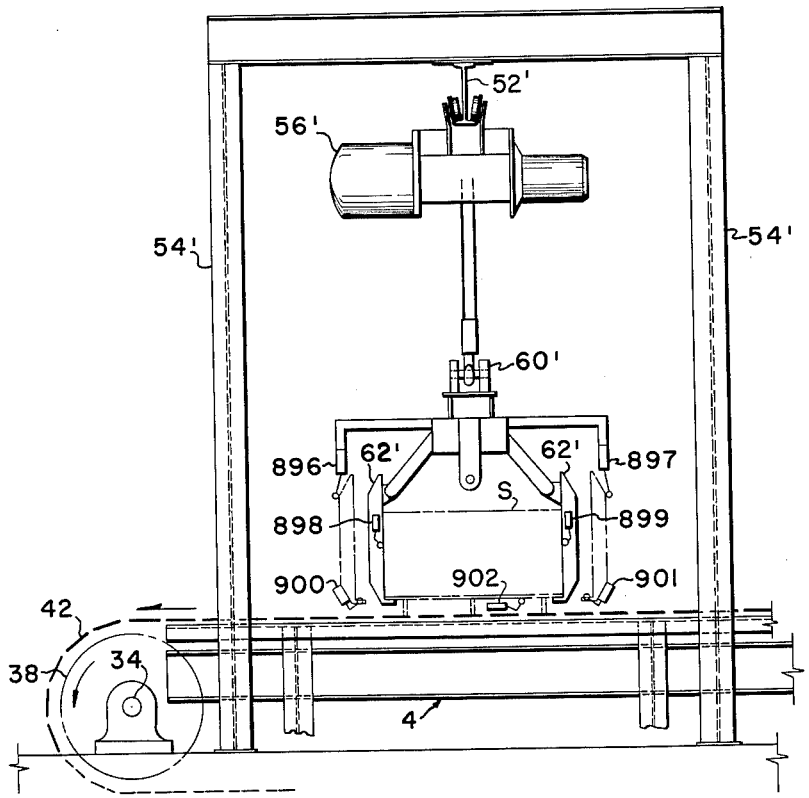
FIG_37
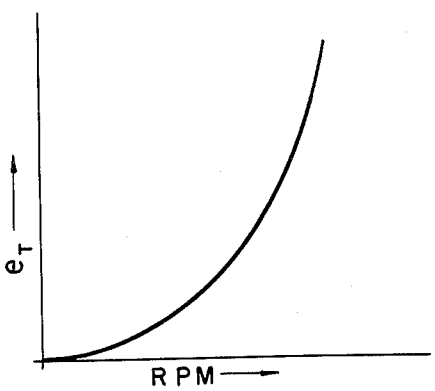
FIG_39

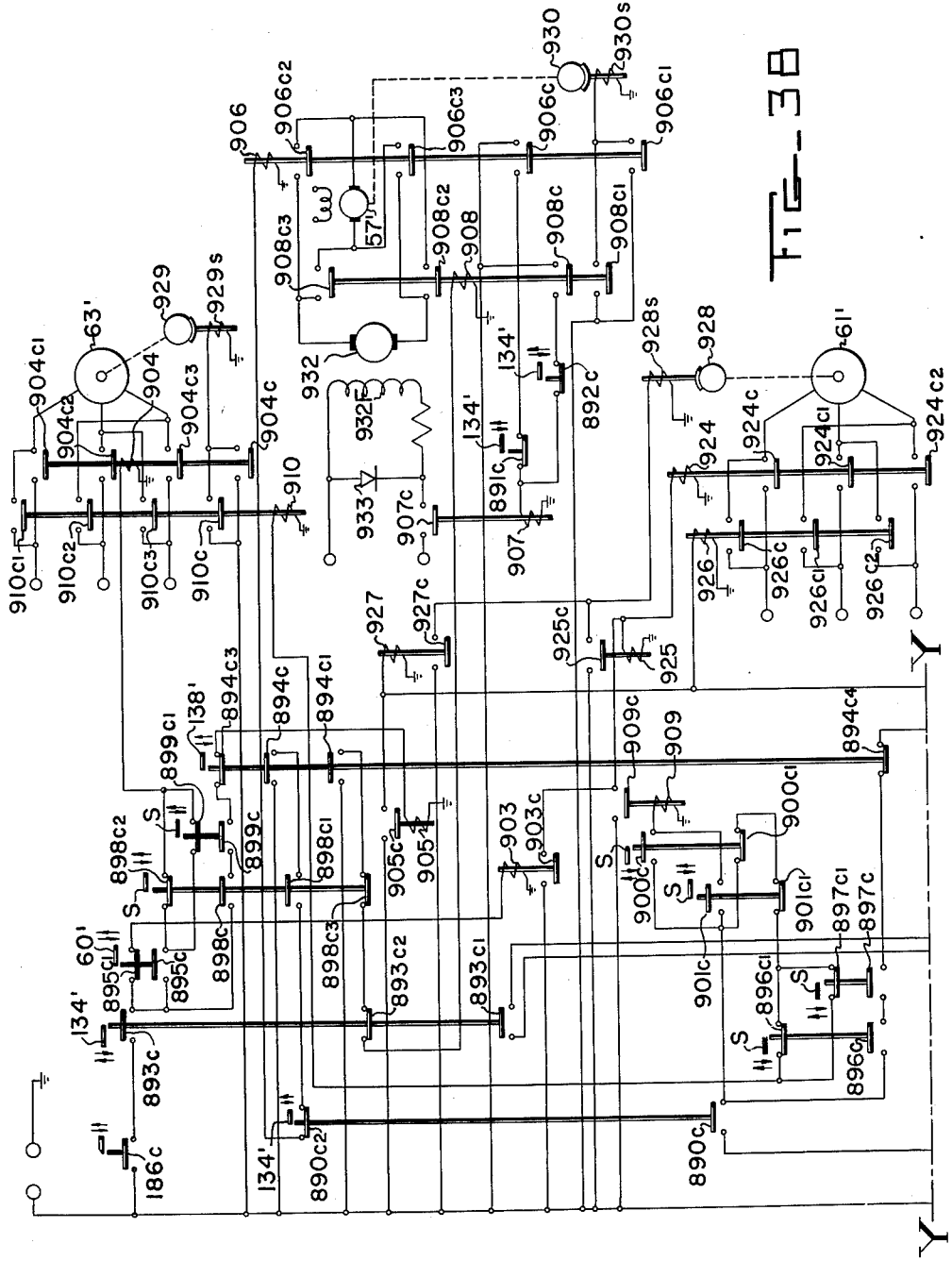

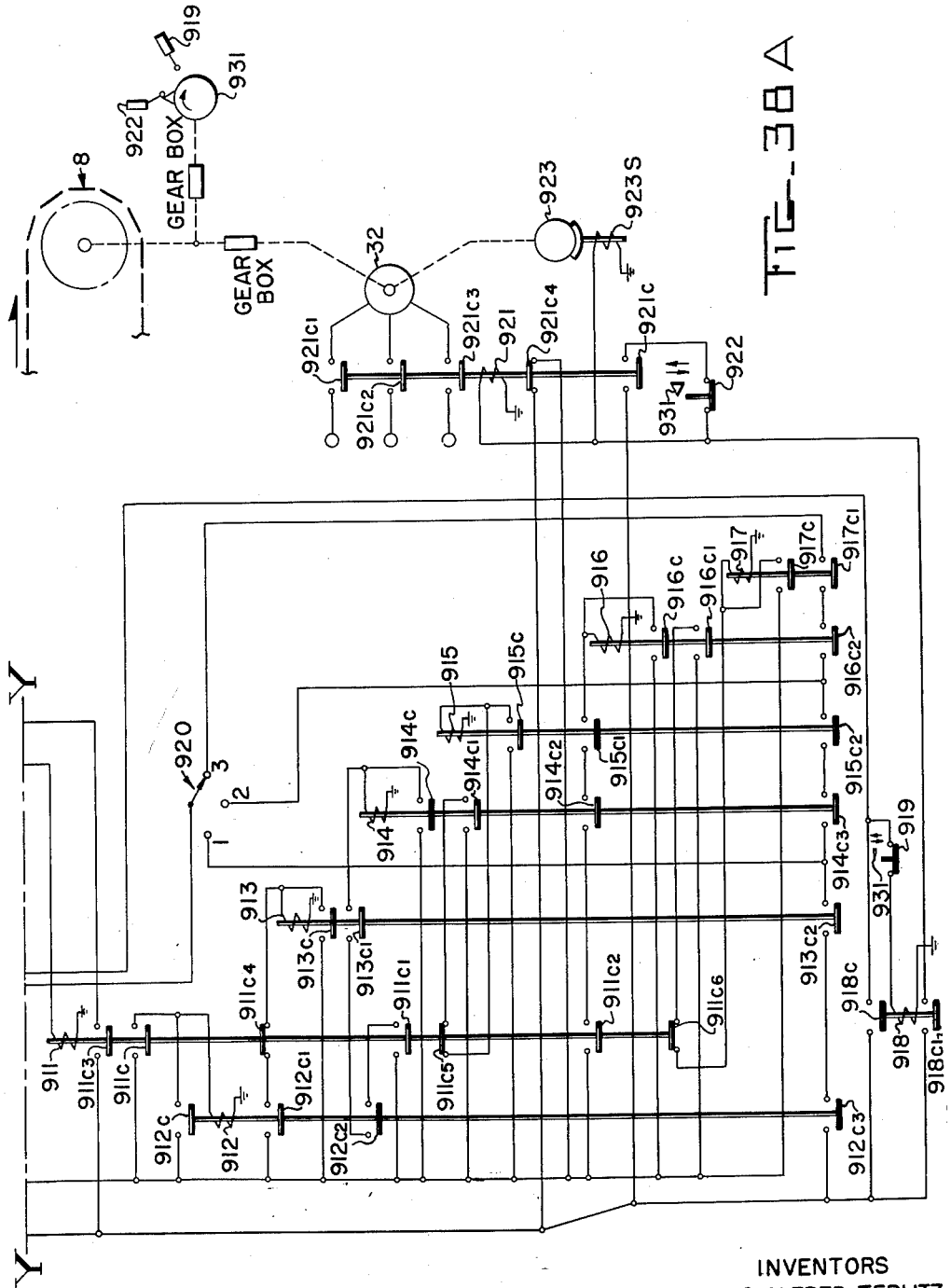

Feb. 6, 1962   F. SLAMAR ET AL   3,019,577
PACKAGING LINE

Filed Sept. 9, 1958   25 Sheets-Sheet 25

INVENTORS
FRANK SLAMAR & ALFRED TEPLITZ
by Donald G. Dalton
attorney 3,019,577
PACKAGING LINE
Frank Slamar, Monroeville, and Alfred Teplitz, Pittsburgh, Pa., assignors to United States Steel Corporation, a corporation of New Jersey
Filed Sept. 9, 1958, Ser. No. 760,005
10 Claims. (Cl. 53—74)

This invention relates to a packaging line and more particularly to a line for packing bundles of tin plate.

The tin plate bundle normally consists of a wooden platform having runners with sheets of tin plate carried on the platform. The tin plate is normally covered with waterproof paper which in turn is covered with heavy paper or cardboard. To protect the corners of the tin plate it is also common to provide vertical corner angles and horizontal corner angles. The parts are then held together by vertical and/or horizontal strapping. These parts are assembled manually so that the cost of assembling the bundles is high.

It is therefore an object of our invention to provide apparatus for packaging tin plate in which most of the operations are carried out automatically.

Another object is to provide apparatus for handling bundles of tin plate.

Still another object is to provide apparatus for wrapping waterproof paper about a bundle of tin plate.

A further object is to provide apparatus for wrapping a bundle of tin plate within a container.

These and other objects will be more apparent after referring to the following specification and attached drawings, in which:

FIGURE 1 is a schematic view of the packaging line including the interlocking controls;

FIGURE 2 is a schematic view of the entry conveyor;

FIGURE 3 is an enlarged view taken on the line III—III of FIGURE 2;

FIGURE 4 is a view taken on the line IV—IV of FIGURE 2;

FIGURE 5 is an enlarged view of a detail of the conveyor chain;

FIGURE 6 is a schematic elevation of the entry transfer;

FIGURE 7 is a view taken on the line VII—VII of FIGURE 6;

FIGURE 8 is a view taken on the line VIII—VIII of FIGURE 6;

Figure 29:
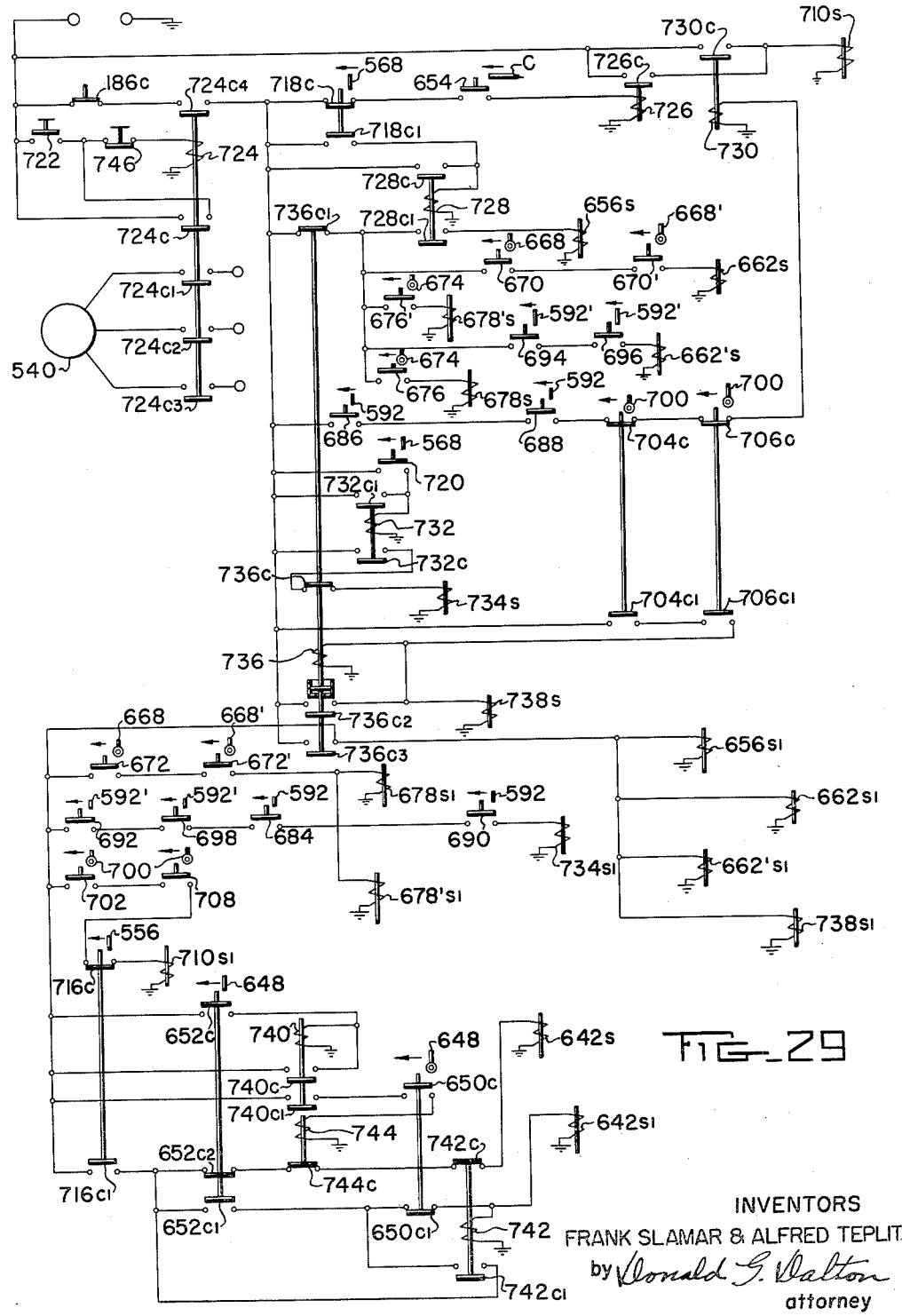
Figure 40:
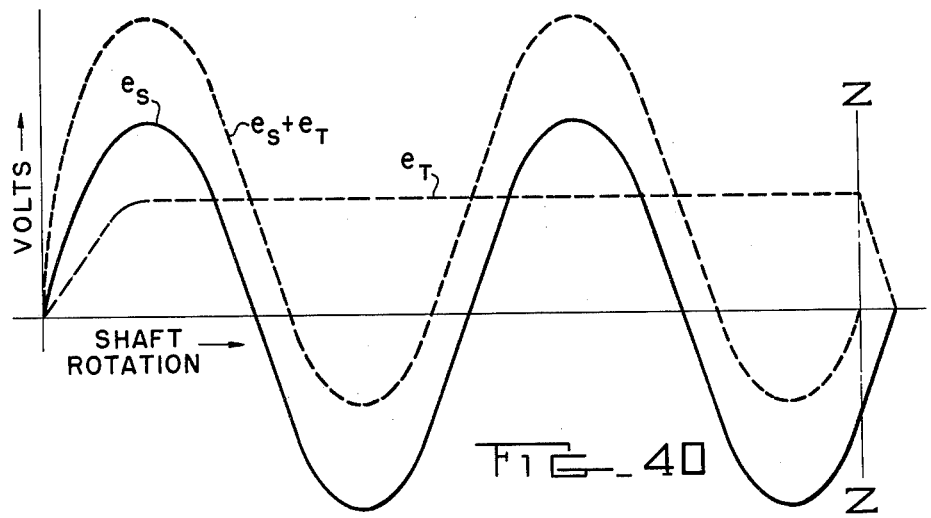
Figure 30:
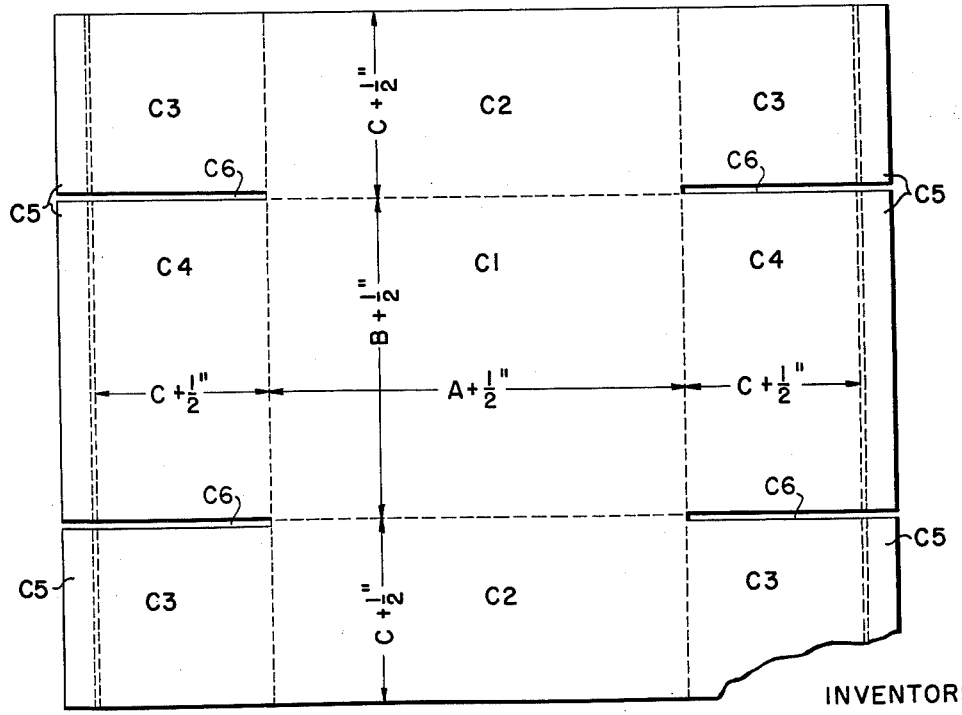
Figure 31:
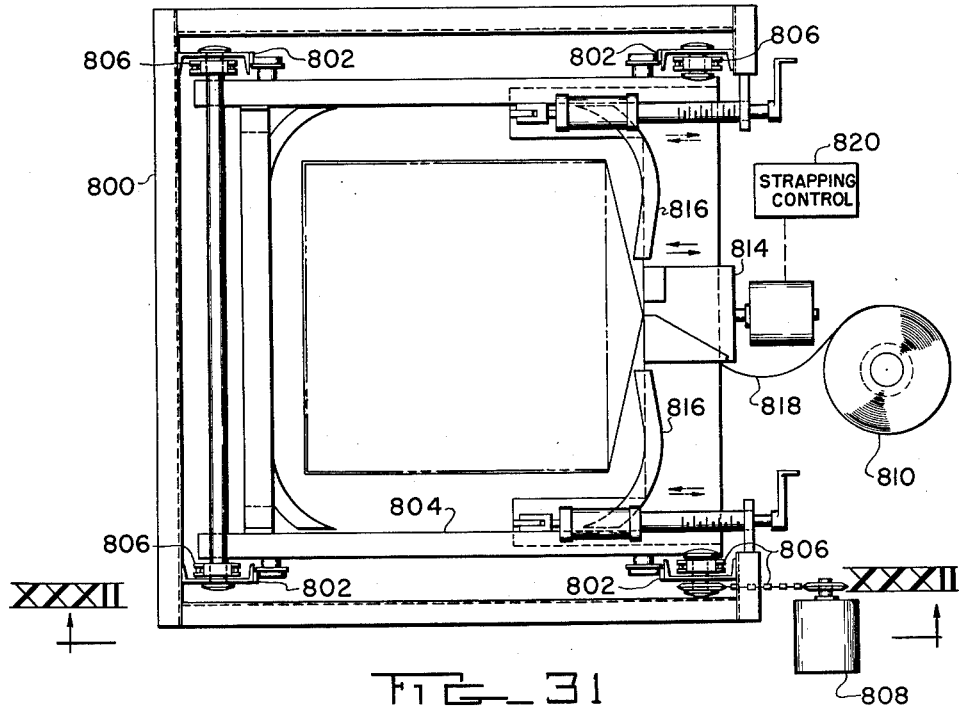
Figure 32:
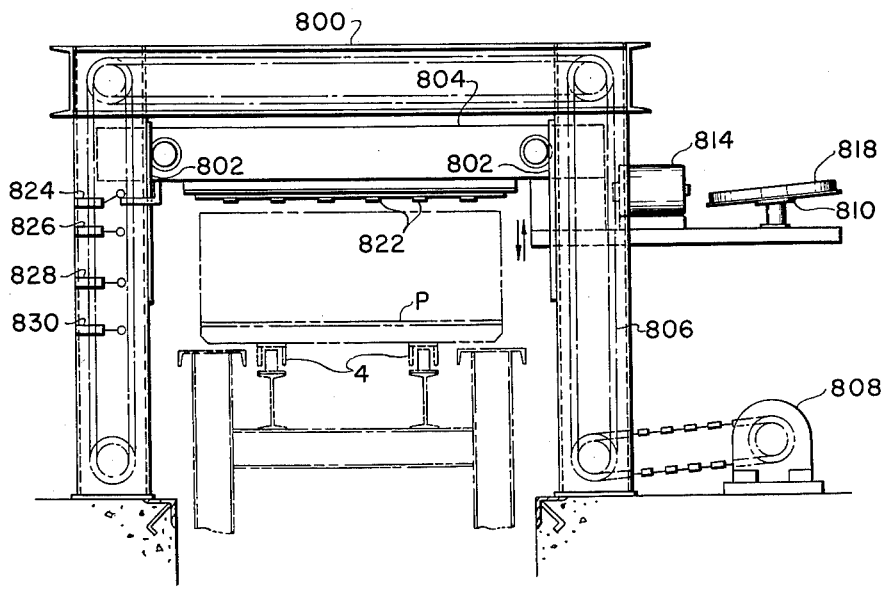
Figure 41:
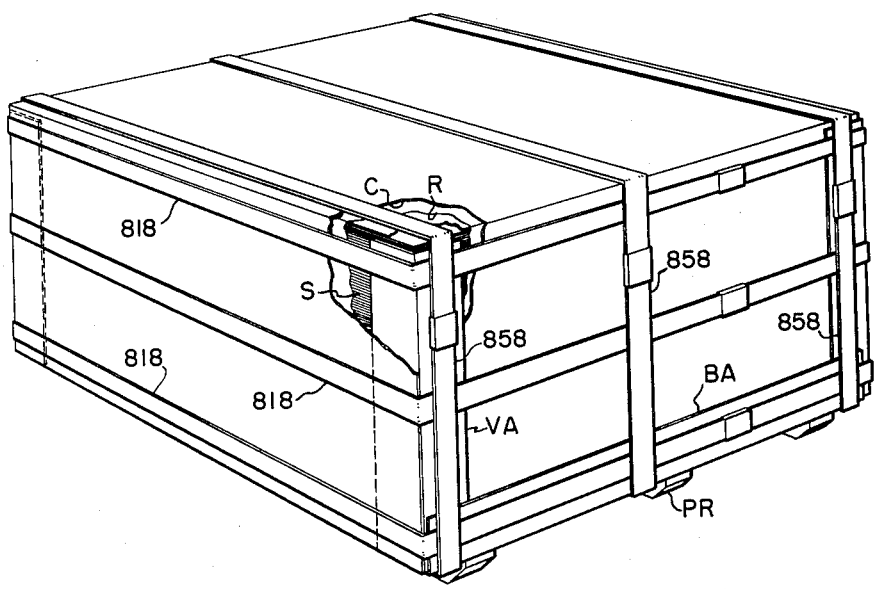

FIGURES 9 and 9A when connected on the lines X—X disclose a schematic electrical diagram for controlling the operation of the entry conveyor and transfer;

FIGURE 10 is a schematic view of the weighing station and the electrical and fluid controls therefor;

FIGURE 11 is an elevation, with parts shown in section, of the wrapping station;

FIGURE 12 is a view taken on the line XII—XII of FIGURE 11;

FIGURE 13 is a view taken on the line XIII—XIII of FIGURE 11;

FIGURE 14 is a view taken on the line XIV—XIV of FIGURE 12;

FIGURE 15 is a schematic diagram of the electrical controls for the wrapping station;

FIGURE 16 is a plan view of the apparatus for handling the container paper;

FIGURE 17 is a view taken on the line XVII—XVII of FIGURE 16;

FIGURE 18 is an enlarged sectional view taken on the line XVIII—XVIII of FIGURE 16;

FIGURE 19 is a view taken on the line XIX—XIX of FIGURE 17;

FIGURE 20 is a transverse elevation showing part of the equipment at station 5 with parts shown in section;

FIGURE 21 is an elevation of the side tab folding device;

FIGURE 22 is a view taken on line XXII—XXII of FIGURE 20;

FIGURE 23 is a view taken on line XXIII—XXIII of FIGURE 22;

FIGURE 24 is a view taken on line XXIV—XXIV of FIGURE 23;

FIGURE 25 is a transverse elevation showing other parts of the equipment at station 5;

FIGURE 26 is a view taken on line XXVI—XXVI of FIGURE 25;

FIGURE 27 is a view taken on line XXVII—XXVII of FIGURE 25;

FIGURE 28 is a view taken on line XXVIII—XXVIII of FIGURE 27;

FIGURE 29 is a schematic diagram of the electrical controls for the container assembly station;

FIGURE 30 is a view showing the container in flat form;

FIGURE 31 is a plan view of the apparatus at the horizontal strapping station;

FIGURE 32 is a view taken on the line XXXII—XXXII of FIGURE 31;

FIGURE 33 is a schematic diagram showing the electrical controls for the horizontal strapping apparatus;

FIGURE 34 is a plan view of the apparatus at the vertical strapping station and showing the electrical controls;

FIGURE 35 is a view taken on the line XXXV—XXXV of FIGURE 34;

FIGURE 36 is a schematic elevation of the exist transfer;

FIGURE 37 is a view taken on the line XXXVII—XXXVII of FIGURE 36;

FIGURES 38 and 38A, when connected on the lines Y—Y, disclose a schematic electrical diagram of the controls for the exit transfer;

FIGURE 39 is a speed-voltage curve of a generator shown in FIGURE 1;

FIGURE 40 shows the relationship between the movement of the packaging conveyor and various voltages in the control circuit; and FIGURE 41 is a view of the completed package.

Referring more particularly to FIGURE 1 of the drawings, reference numeral 2 indicates the entry conveyor. A packaging conveyor 4 is arranged parallel to conveyor 2 with its entry end at a position alongside the exit end of conveyor 2. A monorail transfer 6 is arranged above the conveyors 2 and 4 adjacent the exit end of conveyor 2. A discharge conveyor 8 is arranged in generally aligned relationship with conveyor 2 with its entry end alongside the exit end of conveyor 4. A monorail transfer 10 is arranged above the conveyors 4 and 8 adjacent the exit end of conveyor 4.

As shown in FIGURES 2 to 5 the entry conveyor is of conventional apron type design having a head shaft 12 and tail shaft 14 on which are mounted sprockets 16 and 18, respectively. The sprockets 16 and 18 engage pallets 20 arranged in a continuous chain. The pallets have outboard wheels 22 which ride on upper tracks 24. The pallets 20 ride on lower return rollers 26. A suitable slack take-up device 28 supports the tail shaft 14. The shaft 12 is driven by a motor 30 through suitable gearing. The conveyor 8 is shorter than conveyor 2 but its construction is otherwise the same. The conveyor 8 is driven by a motor 32 through suitable gearing.

The packaging conveyor 4 is of conventional design and has a head shaft 34 and tail shaft 36 on which are mounted sprockets 38 and 40, respectively. The sprockets 38 and 40 engage two parallel strands of large pitch roller chains 42. The chains 42 include rollers 44 which ride on upper tracks 46. The chains 42 ride on lower return rolls 48. A suitable take-up device (not shown) is preferably provided. The shaft 34 is driven by motor 50 through suitable gearing.

As shown in FIGURES 6 to 8 the monorail or entry bundle transfer 6 includes a beam or rail 52 supported by columns 54, a trolley and hoist 56 mounted on the beam 52 and traversed by means of motor 57, an assembly of vertical rollers 58 carried by hoist 56, and a sheet lifter 60 carried by the roller assembly 58. The lifter 60 is raised and lowered by a motor 61 and may be of any standard form. It includes two parallel moving lifting angles or jaws 62 which engage a wood platform P on which sheets S are piled. The angles 62 are movable toward and away from each other in any desired manner by means of a motor 63. The lifter 60 also has an adjustable centering arm 64 at the end thereof adjacent conveyor 4. The arm 64 may be adjusted longitudinally by a motor operated screw and nut arrangement 66. A squaring stop 68 is mounted on columns 54 adjacent conveyor 4. The stop 68 includes spaced brackets 70 each carrying horizontally disposed rollers 72 providing a guide for receiving and centering the roller assembly 58. The stop proper includes horizontally disposed rollers 74 arranged at the end of rollers 72 and mounted on a spring backed plate 76. An hydraulic shock absorber 78 carries the spring backed plate 76.

Nine stations or stops are arranged along packaging conveyor 4. Station No. 1 is directly beneath squaring stop 68 and station No. 9 is directly beneath beam 52' of monorail transfer 10.

*Entry conveyor and transfer*

Power to conveyor motor 30 is supplied from a generator 80 having a field winding 80F. A relay coil 82 having a normally closed contact 82C is connected across the output leads of generator 80. Voltage is supplied to field 80F of generator 80 through an amplifier 84. Reference voltage is applied to generator 80 and amplifier 84 from D.C. power source 86 through network 88 consisting of resistors 90 and 92, capacitor 94 and normally open contact 96C operable by relay coil 96. Relay coil 96 also has a normally open contact 96C1 located in the circuit to amplifier 84 and a normally open contact 96C2. When relay coil 96 is energized closing its contacts, generator 80 and amplifier 84 form a closed-loop voltage regulating system with network 88 providing a delay in the application of voltage from source 86 so that the generator voltage will build up gradually and give a controlled acceleration to motor 30. Motor 30 is also mechanically connected to a tachometer generator 98 and through a magnetic clutch 100 to slider 102S of rheostat 102 which has a square root characteristic. Power source 104 is connected across the terminals of rheostat 102. Generator 98 is connected to amplifier 84 by leads 106 and 108. Normally open contact 110C operable by relay coil 110 is provided in lead 106. A circuit including Thyratron tube 112, secondary 114S of transformer 114, and relay coil 116 is connected across leads 106 and 108. Relay coil 116 operates a normally closed contact 116C and a normally open contact 116C1. A light source 118 and a photoelectric cell 120 are located adjacent the exit end of conveyor 2 at an elevation where the smallest bundle of sheets S on the conveyor will interrupt the light beam. Means 122 are provided to adjust the position of light beam 118 and photoelectric cell 120 longitudinally of conveyor 2. A relay coil 124 is connected to photocell 120 and is energized when the light beam is interrupted. Relay coil 124 operates normally closed contact 124C and normally open contacts 124C1 and 124C2. Supported from beam 52 in the path of movement of trolley 56 are switches 126, 128, 130 and 132. Switch 126 has normally open contacts 126C and 126C1 and normally closed contact 126C2 and is operable by cam 134 mounted on trolley 56. Contact 126C1 is in the permissive circuit of packaging conveyor 4 as shown in FIGURE 1. Switch 128 will open when contacted by cam 134 moving to the left as seen in FIGURE 6 and close when contacted by cam 134 moving to the right. Switch 130 operates the reverse of switch 128. Switch 132 has normally open contacts 132C and 132C1 and normally closed contacts 132C2. A top limit switch 136 is mounted on trolley 56 and is operated by a cam 138 mounted on roller assembly 58. Switch 136 has normally open contacts 136C, 136C1 and 136C2 and normally closed contacts 136C3 and 136C4. Contact 136C2 is in the permissive circuit of conveyor 4 as shown in FIGURE 1. A switch 140 having normally closed contact 140C and normally open contact 140C1 is mounted on the arm 64. A switch 142 having normally closed contact 142C and normally open contact 142C1 is mounted on the lifter 60 and may be adjusted vertically to suit the size bundle being handled. A switch 144 is mounted on the frame of conveyor 4 and has normally closed contact 144C and normally open contact 144C1. Switch 146 is mounted on one of the jaws 62 and has two normally closed contacts 146C and 146C1 and two normally open contacts 146C2 and 146C3. A switch 148 is mounted on the other jaw 62 and has a normally closed contact 148C and a normally open contact 148C1. A switch 150 is adjustably mounted on lifter 60 and has a normally closed contact 150C and a normally open contact 150C1. Brakes 152, 154 and 156 are associated with motors 57, 61 and 63, respectively, and are of the type that are in released position when their solenoids are energized and are applied by spring pressure when their solenoids are deenergized. Motor 57 is energized from a generator 158 having a field winding 158F. The circuit for field 158F includes a D.C. power source 160, rectifier 162 and resistor 164.

The operation of the entry conveyor 2 and transfer 6 is as follows: The operator by means of a fork tractor 165 places bundles of sheets S on the entry conveyor 2 with the platform P so arranged that the runners PR run transversely of the conveyor. If bundles are piled one on top of the other they must be arranged so that the one on top is positioned with its sides in general alignment with the one below. The light 118 and photocell 120 are adjusted to their correct position for the particular size bundle being handled and any other necessary adjustments are made. No further adjustment is necessary until bundles of a different size are to be packaged. When there is no bundle in the take-off position at the end of the conveyor 2 the photocell 120 will be illuminated and the relay coil 124 will be deenergized and its contact 124C will be closed. If the switch contact 136C is closed or the trolley 56 is over the packaging conveyor 4 so that switch contact 132C is closed, a circuit will be completed through relay coil 96. This closes contacts 96C and 96C1, thus energizing motor 30 and causing conveyor 2 to advance until a bundle interrupts the light beam to photocell 120 which energizes relay coil 124. This causes clutch 100 to engage, thus moving slider 102S downwardly as seen in FIGURE 9. When the voltage across wires 106 and 108 is approximately zero, tube 112 will fire and energize coil 116, thus opening contact 116C and closing contact 116C1. Opening of contact 116C deenergizes coil 96 to open contacts 96C, 96C1 and 96C2 and closing of contact 116C1 energizes coil 110 to close contact 110C, changing the regulating system to a position which slows down motor 30 at a constant rate and causes the bundle to be accurately positioned at standstill. When the last bundle is removed from the end of the conveyor and the light beam is exposed, the clutch 100 is deenergized and a spring (not shown) returns slider 102S to its original position. When the conveyor 2 stops with a bundle or bundles in correct position relay coil 82 will be deenergized and its contact 82C will close so that when the trolley 56 is at its back limit with the switch contact 126C closed, relay coil 166 will be energized, thus closing its contact 166C. This in turn energizes relay coil 168, closing its contacts 168C, 168C1, 168C2 and 168C3 to complete a circuit to lifter motor 61 and to brake solenoid 154S to release brake 154. The lifter will lower until switch 142 hits the top of the highest bundle at the end of conveyor 2, thus opening contact 142C and closing contact 142C1. Opening of contact 142C deenergizes motor 61 and sets brake 154. Closing of contact 142C1 energizes relay coil 170, thus closing its contacts 170C which in turn energizes relay coil 172. This closes contacts 172C and 172C1 in the directional circuit of trolley motor 57 and also its contacts 172C2, thus energizing solenoid 152S to release brake 152. Energization of coil 170 also closes its contacts 170C1 and 170C2, which completes circuits through relay coils 174 and 176. Energization of relay coil 174 closes its contact 174C which completes a parallel circuit to relay coil 172 which is already energized and also closes its contact 174C1. Energization of coil 176 closes its contact 176C, thus energizing motor 57 from generator 158 to move trolley 56 until switch 140 is actuated opening its contact 140C and closing its contacts 140C1. At this time the lifter 60 is centered over the bundle. Closing of contact 140C1 energizes relay coil 178 which closes its contact 178C to complete a circuit through solenoid 156S to release brake 156. Contacts 178C1, 178C2 and 178C3 are also closed completing a circuit to motor 63 causing the jaws 62 to close until switches 146 and 148 are actuated. Actuation of switch 146 opens its contacts 146C and 146C1 and closes its contacts 146C2 and 146C3. Actuation of switch 148 opens its contact 148C and closes its contact 148C1. Closing of contacts 146C2 and 148C1 completes a circuit through relay coil 180 closing its contact 180C which energizes relay coil 182 closing its contact 182C to close a parallel circuit to solenoid 154S and also closing its contacts 182C1, 182C2 and 182C3 in the circuit of lifter motor 61. This raises the lifter 60 until switch 136 is actuated, thus closing its contact 136C1 to complete a circuit to relay coil 184 which in turn closes its contacts 184C, 184C1, 184C2 and 184C3. Closing of contact 184C completes a circuit to relay coil 176 which in turn closes its contact 176C to apply voltage to generator field 158F. Due to the time delay of the generator field the voltage build-up is gradual giving smooth acceleration to prevent swaying of the trolley 56 as it moves the bundle toward conveyor 4. When the trolley cam 134 actuates switch 130 to open its contact 130C the circuit to field 158F opens and the field is discharged through rectifier 162 to give a smooth deceleration until switch 132 is actuated to close its contacts 132C and 132C1 and open its contact 132C2. Opening of contact 132C2 deenergizes relay coil 184 and the brake 152 is applied stopping the trolley 56. In a manner to be described hereinafter the conveyor 4 closes contacts 186C when it is stopped. If the conveyor 4 is stopped at this time, relay coil 188 will be energized, thus closing its contacts 188C to complete a circuit to relay coil 168 which energizes motor 61 and releases brake 154 to lower the bundle onto conveyor 4. When the bundle is on conveyor 4 switch 144 is actuated to open its contact 144C to stop movement of the lifter 60 and close its contacts 144C1 to complete a circuit to relay 190 closing its contacts 190C, 190C1, 190C2 and 190C3. Closing of the contacts energizes motor 63 and releases brake 156 so as to open the jaws 62. Opening of jaws 62 actuates switch 150 to open its contact 150C and close its contact 150C1. Opening of contact 150C deenergizes motor 63 and applies brake 156. Closing of contact 150C1 energizes relay coil 192 which closes its contact 192C to energize relay coil 182, thus energizing motor 61 and raising the lifter 60 until switch 136 is actuated. This completes a circuit to relay coil 174 through closed contacts 136C1, 126C2, 146C1 and 124C2 provided there is a bundle in the take-off position on conveyor 2. When coil 174 is energized trolley motor 57 will be energized to move trolley 56 back toward the entry conveyor 2 until the trolley 56 actuates switch 128 to open its contact 128C, thus deenergizing relays 174 and 176 which opens the field circuit of motor 57 and causes deceleration of the trolley 56. When switch 126 is actuated by trolley 56 the trolley will stop and the cycle will be repeated.

*Weighing station*

The bundles of sheets are weighed at station No. 2 as shown in FIGURE 10. At this station a scale platform 200 is mounted on load cells 202 or on any other standard type scale. The load cells 202 are mounted on a hydraulic hoist 204. The entire mechanism is located between the strands of roller chains 42 with the platform 200 normally below the top run thereof as shown in full lines. The platform 200 is movable to a position above the top run of the roller chains 42 shown in broken lines by supplying fluid to the bottom of hoist cylinder 204 through a conduit 206 having a solenoid valve 208 therein. A similar conduit 210 having a solenoid valve 212 therein delivers fluid to the top of cylinder 204. A switch 214 is adapted to be contacted by cam 216 on the piston rod 218 when the hoist is raised to its upper position. The switch 214 is normally open and is arranged in circuit with the automatic weighing control 220 and also with a relay coil 222 having normally open contacts 222C and 222C1 and normally closed contact 222C2. A switch 224 is arranged to be actuated by the scale when it moves below the level of the conveyor 4.

The operation at this station is as follows: When the conveyor 4 stops, contact 186C will close thus completing a circuit through solenoid 208S to open the valve 208 and cause fluid to raise the hoist above the top run of roller chains 42. At this upper position switch 214 will close, thus completing a circuit to automatic weighing control 220 and to time delay relay coil 222. Control 220 actuates an automatic weighing device and weighs the bundle on the scale in the usual manner. After a pre-set time to allow for weighing, contact 222C1 will close and contact 222C2 will open, thus sealing in relay coil 222 and deenergizing solenoid 208S. The solenoid 212S is also energized, thus opening valve 212 and lowering the scale. When the package conveyor 4 starts to move the contact 186C will open, thus deenergizing relay coil 222 and resetting the circuit. As the scale lowers it will close switch 224 which is in the permissive circuit for the packaging conveyor 4 as shown in FIGURE 1.

*Wrapping station*

The bundles of sheets S are wrapped with waterproof paper R at station No. 3 by the equipment shown in FIGURES 11 to 15. A paper pay-off reel 300 is mounted adjacent the conveyor 4 for receiving a roll of waterproof paper R. The reel 300 includes a rotatable vertical spindle 302 extending upwardly through a paper-roll-supporting platform 304. Spindle 302 is rotatably mounted in bearings 306 received in hub 308 attached to platform 304. Hub 308 is rotatably mounted in bearings 310. The hub 308 has a bottom extension 312 extending downwardly into a magnetic brake 314. A bracket 316 is attached to a housing 318 and is provided with a drag brake 320 bearing against the underside of platform 304. A carriage 322 is mounted on tracks 324 for movement toward and away from reel 300. Any suitable means may be provided for moving carriage 322 along tracks 324. A pair of vertical payoff pinch rolls 326 and a pair of vertical feed up pinch rolls 328 are mounted in spaced relationship on carriage 322 with a friction drag 330 therebetween adjacent rolls 328. One of the rolls 328 is supported for movement by a fluid cylinder 332 toward and away from the other roll 328. One of the rolls 326 is driven through gear unit 333 by a motor 334 which through chain 336 also drives one of the pinch rolls 328. The friction drag 330 consists of a stationary plate 338 and a spring pressed plate 340 between which paper R passes. A shear 342 of standard construction, a guide 344, and vertical rolls 346 are also mounted on carriage 322. The shear 342, as best shown in FIGURE 14, has a stationary blade 348 and a movable blade 350 which is actuated through mechanism 352 by means of a hydraulic cylinder 354. A loop L is maintained in the paper between rolls 326 and drag 330. For this purpose lamps 356 and 358 are arranged on one side of the loop L and photoelectric cells 360 and 362 on the other side. A lifting turntable 364 is mounted between the roller chains 42 adjacent the carriage 322. The turntable 364 consists of a bundle receiving platform 366 movable from a position below roller chains 42 to a position above chains 42 by means of a fluid cylinder 368. The platform 366 is mounted on a square shaft 370 which is free to slide within inner sleeve 372 of bearing 374. The inner sleeve 372 is mounted for rotation with a bevel gear 376 which is attached to the lower end thereof. The gear 376 is connected through a bevel pinion 378 to a motor 380. A thrust bearing 382 at the lower end of shaft 370 permits relative rotation between the piston rod of cylinder 368 and shaft 370. An electromagnet 384 having a switch 386 mounted thereon is suspended by means of a cable 388 from a trolley 390. A counterweight 392 is mounted on the other end of cable 388. The trolley 390 is mounted on a rotatable arm 394 with its axis of rotation aligned with the axis of turntable 364. The arm 394 is mounted on a suppport 396. Collector rings 398 surround a shaft 400 about which the arm 394 rotates so as to supply power to magnet 384.

Fluid is introduced into the top of cylinder 354 through a conduit 402 having a solenoid valve 404 therein and into the bottom of cylinder 354 through a conduit 406 having a solenoid valve 408 therein. A switch 410 having normally closed contact 410C and normally open contact 410C1 is operable by the shear mechanism 352. A similar switch 412 is also operated by the mechanism 352 and has normally closed contacts 412C and 412C1 and normally open contact 412C2. Fluid is introduced into the bottom of cylinder 368 through a conduit 414 having a solenoid operated valve 416 therein and into the top thereof through a conduit 418 having a solenoid operated valve 420 therein. The turntable motor 380 is connected to drive a cam 422 which makes a complete revolution for each complete revolution of the turntable. A switch 424 having a normally closed contact 424C and normally open contact 424C1 is mounted to be operated by the cam 422. A switch 426 is also located adjacent the cam 422 and is operable thereby, the switch 426 being located 270° from switch 424 in the direction of rotation of the cam 422. Switch 426 has normally closed contact 426C and normally open contact 426C1. A top limit switch 428 having normally open contacts is located adjacent the turntable 364 and is operated thereby when the turntable reaches its top position. A switch 430 is also located adjacent the turntable and is operable thereby when the turntable is in its lowest position. The switch 430 has normally closed contact 430C and normally open contact 430C1 located in the permissive circuit of the packaging conveyor 4 shown in FIGURE 1. Motor 334 is energized from a generator 432 having two fields 432F and 432F′, the fields receiving power from D.C. power source 434. The photoelectric cell 360 is connected to a relay coil 436 which is energized when the loop L is positioned to let light fall on photocell 360. When this happens contacts 436C and 436C1 will close to provide power to the field 432F′ in such a manner as to increase the speed of motor 334. Photoelectric cell 362 operates a relay coil 438 which will be energized when the loop L cuts off the light ray from light 358, thus closing contacts 438C and 438C1 to connect the field 432F′ in such a manner as to decrease the speed of motor 334. Fluid is introduced to the end of cylinder 332 adjacent roll 328 through a conduit 440 having a solenoid operated valve 442 therein and to the opposite end through a conduit 444 having a solenoid operated valve 446 therein. Motor 380 is provided with a brake 448 which is released when its solenoid 448S is energized. A foot operated switch 450 is located in a convenient spot for operation by the operator. Switch 450 has normally closed contacts 450C and 450C1 and normally open contacts 450C2 and 450C3.

In operation the carriage 322 is positioned so that the correct length of paper is provided for wrapping the particular size of bundle being processed. When the packaging conveyor 4 stops contacts 186C will close. This energizes solenoid 416S, thus opening valve 416 to raise the turntable 364 above the conveyor to a mechanical stop. The turntable 364 closes switch 428 to energize time delay relay coil 452. The time delay relay coil 452 is such that a predetermined time interval will occur between the time energy is applied thereto and its operation. During this time delay period the operator clamps the end of the paper to the bundle in the position shown in FIGURE 12, this being done by closing the switch 386 which supplies current to relay coil 454. Energization of coil 454 opens its contact 454C and closes its contact 454C1, thus sealing in coil 454. Contact 454C2 is also closed to energize the clamp magnet 384. The paper is held between the magnet 384 and the sheets S. After the pre-set time delay, contact 452C will close to energize relay coil 456. This closes contact 456C which completes a circuit through solenoid 448S to release brake 448. Closing of contact 456C also completes a circuit through relay coil 458. Energization of relay coil 458 closes its contacts 458C, 458C1, 458C2, thus energizing turntable motor 380 and starting the turntable rotating. Contacts 458C3 and 458C4 are also closed, thus completing circuits through relay coil 460, brake solenoid 314S and valve solenoid 442S. Energization of relay coil 460 closes contacts 460C and 460C1, thus supplying current to field 432F and causing motor 334 to rotate rolls 326 and 328. Energization of solenoid 314S releases brake 314 and energization of solenoid 442S will open valve 442 to separate the rolls 328 so that the paper can be readily pulled through the system. Closing of contact 458C3 also completes a circuit through relay coil 464 closing contact 464C which connects the circuit for the regulator of loop L. Thus, if the loop moves outside the space between the two photoelectric cells 360 and 362 the second field 432F′ will be connected to increase or decrease the motor speed and return the loop L to this region. After the turntable has rotated through three-fourths of a revolution the switch 426 will be operated to open its contact 426C to stop rotation of the turntable 364 and close its contact 426C1 to energize relay coil 466. This closes its normally open contact 466C to seal coil 466 in and also closes normally open contacts 466C1 and 466C2 and opens normally closed contact 466C3. Closing of contact 466C1 energizes solenoid 404S to open valve 404 to cause shear blade 350 to move against shear blade 348 and cut the paper R. When the shear operating mechanism completes its stroke it actuates switch 412 to open its contacts 412C and 412C1 and close its contact 412C2. Closing of contact 412C2 energizes relay coil 468 to close its normally open contacts 468C and 468C1 to open its normally closed contact 486C2. Closing of contact 468C seals in coil 468 and closing of contact 468C1 energizes relay coil 470 to close its contact 470C, thus rotating the turntable until it completes one revolution and operates switch 424 to open contact 424C and stop the turntable. Switch contact 424C1 is closed at the same time, thus energizing relay coil 472 to open its contact 472C. This deenergizes relay coil 454 to close its contact 454C which energizes solenoid 420S to open valve 420. Since valve 416 has previously been closed by opening of contact 468C2 the turntable will be lowered. At the same time opening of contact 454C2 deenergizes clamp magnet 384. The portion of the paper extending above the bundle is bent down on the top thereof by the operator during the rotation of the turntable. When conveyor 4 starts moving contact 186C opens to deenergize all coils and solenoids. When conveyor 4 is advancing paper is fed up to position by depressing switch 450 which energizes solenoid 446S to move the rolls 328 together. Depressing switch 450 also completes the circuit to motor 334.

The operation for wrapping the next bundle is the same as described above except for changes due to the shear mechanism 352 being in its lower position with contacts 410C and 412C2 being closed and contacts 410C1, 412C and 412C1 being open. Thus, when switch contact 426C1 is closed relay coil 474 will be energized closing its contacts 474C, 474C1 and 474C2 and opening its contact 474C3. Closing of contact 474C1 energizes solenoid 408S to open valve 408 to cause shear blade 350 to cut the paper R and to return to the position shown. Switch 410 is actuated to open its contact 410C and close its contact 410C1 to energize relay coil 468 with the operation then continuing as described above.

Container assembly stations

The bundles of sheets S covered with the waterproof paper R are wrapped with container paper C and the reinforcing angles are installed at stations 4 and 5 by means of the equipment shown in FIGURES 16 to 29. A carriage or movable table 500 straddles the conveyor 4 at station No. 4 with a part thereof extending over station No. 5. The carriage 500 has a top 502 made of a steel plate and supported on legs 504 having wheels 506 at their lower ends. The wheels 506 are supported on rails 508 which extend lengthwise of conveyor 4 and are located one at each side of the conveyor. The table 500 is reciprocated on the rails 508 by means of a pair of hydraulic motors 510, each of which has its cylinder 512 pivotally mounted on a stationary bracket 514 and its piston rod 516 pivotally attached to its forward leg 504. An hydraulic cylinder 518 is supported beneath the plate 502 and has its piston rod 520 connected to the center of a transverse bar 522. A longitudinal slot 524 is provided in plate 502 at each end of the bar 522 and a cross-shaped bar 526 is supported for sliding movement in each slot 524 as best shown in FIGURE 18. Each bar 526 is attached to the top of bar 522. A transverse pusher bar 528 mounted on top of plate 502 is attached to the top of bars 526. A plurality of fingers 530 are mounted on pusher bar 528 by means of springs 532. A transverse beam support 534 is mounted on the forward end of plate 502 and carries a pair of pinch rolls 536 which are driven by a chain 538 from a motor 540 mounted below table top 502. One of the rolls 536 is preferably steel faced and the other rubber covered. Adjustable stops 542 are mounted on support 534 with their bottom ends slightly above table top 502. A container tray 544 consisting of two spaced angles 546 extends from the forward end of the carriage 500. The angles 546 are supported from beam support 534 by means of transversely adjustable brackets 548 which also support side guides 550. An end stop 552 is adjustably mounted on the forward end of each angle 546 and a back stop 554 is mounted adjacent the lower roll 536. The cylinder 518 and motor 540 are a sufficient distance above conveyor 4 to permit passage of the bundles of tin plate.

The container folding device is located at station No. 5 between angles 546 and includes a bundle hoist 556 having a platform 558 and a hydraulic cylinder 560 located therebeneath. The platform 558 is located between the chain strands of conveyor 4 and is movable from a position below the top of the conveyor to a position above the top thereof. A platen assembly 562 is located directly above platform 558 and is slidably mounted in framework 564. Stop 566 limits downward movement of assembly 562. The assembly 562 consists of a vertical member 568 and two horizontal elements 570 mounted on the lower end thereof. The elements 570 have grooves 572 and 574 therein extending transversely of the conveyor 4 for slidably receiving plates 576 and 578, respectively. Mounted on the outer upper side of the plates 576 and 578 are sets of three hydraulic motors 580 and 580' of the type having a rotatable shaft, such as a Bonnot hydromotor. The axes of the shafts of the motors of each set are in alignment. Plates 582 and 582' are mounted on the shaft of the center motors 580 and 580' respectively, and are rotatable from a horizontal to vertical position. Plates 584 and 584' are mounted on the shafts of the two end motors 580 and 580', respectively, and are also rotatable from a horizontal to vertical position. Plates 584 and 584' are provided with ways 586 and 586' at each end. Blocks 588 and 588' carrying angles 590 and 590' are mounted in the ways 586 and 586' and are slidably movable by means of hydraulic motors 592 and 592' of the cylinder and piston type. The leg of each of the angles 590 abutting the block 588 is recessed to receive permanent magnets 594 for a purpose which will appear later. Similar magnets are provided on angles 590'. An ejector cylinder 596 is mounted on block 588 with its piston rod 598 extending through a hole in the angle 590 between the magnets 594. A similar cylinder 596' is mounted on block 588'. The motors 592 and 592' are mounted on adjustable blocks 600 and 600' respectively mounted in ways 586 and 586'. An end folding device is suspended from the framework 564 and consists of two spaced brackets 602 each carrying two hydraulic motors 604 at its lower end, the shafts of each pair of motors 604 carrying an arm 606 on which is mounted a roller 608. The brackets 602 are adjustably mounted for movement toward and away from each other. The motors 604 are of the same type as motors 580.

Also positioned at the transverse center of station 5 are a pair of beams or tracks 610 supported from the framework 564 and extending to a point over the conveyor 4. A carriage 612 carrying a horizontal support 614 for an angle BA is supported on beam 610. Each carriage 612 consists of an inner box shaped member 616 carrying eight wheels 618 which track on the inner surfaces of the flanges of beams 610 as shown and an outer box shaped member 620 surrounding the member 616. The inner box shaped member 616 carries an air operated stop cylinder 622 having a piston rod which extends through a hole in the wall of member 616 and is adapted to bear against beam 610 to hold the carriage 612 from moving. The member 616 also carries an air operated lifting cylinder 624 having a piston rod connected to member 620 by means of bearing 626. A rod 628 connected to the bottom of member 616 extends into a bearing 630 carried by member 620. Hence, member 620 can be lifted vertically by cylinder 624 and rotated about the bearings 626 and 630. Two vertical supporting members 632 are connected to member 620 on opposite sides thereof. An inwardly extending horizontal angle 634 is connected to each member 632 by means of bolts 636 which permit vertical adjustment of angle 634. A support angle 638 is attached to the free end of each angle 634 with one leg extending vertically and the other extending horizontally toward the center of conveyor 4. The legs of angles 638 carry permanent magnets 640.

As shown in FIGURE 16 movement of piston rod 520 is controlled by means of a double solenoid 4-way valve 642 which controls flow of fluid into conduits 644 and 646 leading to opposite ends of cylinder 518. A cam 648 is mounted on piston rod 520 for actuating switches 650 and 652 which are mounted on the carriage 500. A switch 654 (FIGURE 17) is mounted on one of the angles 546 and is adapted to be actuated by container C in unfolded condition. As shown in FIGURE 23 a 4-way double solenoid operated valve 656 controls flow of fluid to the center motors 580 and 580' through conduits 658 and 660. Similar valves 662 and 662' control flow of fluid to end motors 580 and 580' through conduits 664 and 666 and 664' and 666'. Cams 668 and 668' are mounted on the shaft of the center motors 580 and 580', respectively. A pair of switches 670 and 672 (FIGURE 20) are mounted on the plate 576 ninety degrees apart. A similar pair of switches 670' and 672' are mounted on the plate 578. A cam 674 (FIGURE 24) is mounted on the shafts of the outer motors 580 and a similar cam 674' is mounted on the shaft of the outer motors 580'. The switch 676 is mounted on the plate 576 adjacent the cam 674 and a similar switch 676' is mounted on the plate 578 adjacent the cam 674'. Fluid is introduced to each of the cylinders 592 through a 4-way double solenoid valve 678 and conduits 680 and 682 and to each of the cylinders 592' through a 4-way solenoid operated valve 678' and conduits 680' and 682'. (See FIGURE 23.) Mounted on the plates 584 are switches 684, 686, 688 and 690. Located on plates 584' are switches 692, 694, 696 and 698. Cams 700 (FIGURE 24) are mounted on the shafts of motors 604 and are adapted to contact switches 702, 704, 706 and 708 mounted on brackets 602. As shown in FIGURE 20 fluid is introduced into opposite ends of cylinder 560 through a 4-way double solenoid operated valve 710 and conduits 712 and 714. A switch 716 is mounted adjacent the path of travel of hoist 556. Switches 718 and 720 are mounted on the frame 564 adjacent the vertical member 568.

The operation of the aparatus at stations 4 and 5 is as follows: A pile of paper or cardboard containers C are arranged on table top 502 with their forward ends abutting the stop 542. The containers C are of the type shown in Miller and Nichol Patent No. 2,847,120, dated August 12, 1958. The container C (FIGURE 30) has a central section C1 slightly larger than the sheets S, a side flap C2 on each side of section C1, a side tab C3 on each end of each side flap C2, an end flap C4 on each end of section C1 between side tabs C3, and aligned tuck ends C5 at the end of each side tab C3 and end flap C4. The various sections of the container C are defined by score lines while longitudinal cuts C6 separate side tabs C3 from end flaps C4. The containers C are arranged with the section C1 and end flaps C4 aligned with conveyor 4. The angles 546 and side guides 550 are adjusted so that they are spaced apart the correct distance for receiving the containers C. The end stops 552 are adjusted so that the distance between stops 552 and 554 is equal to the total length of container C in expanded position and the carriage 500 is adjusted longitudinally by hydraulic motor 510 to a point where the mid-point between stops 552 and 554 is directly above the transverse center of station 5. The plates 576 and 578, blocks 600 and 600' and brackets 602 are moved to the correct positions for the particular size container and bundle being assembled. Once adjusted the above described parts are locked in place and not moved until a different size bundle is being wrapped. When is position on plate 502 the rearward end of the bottom container C rests on fingers 530. When a bundle of sheets is centrally positioned on conveyor 4 at station No. 5 pinch rolls 536 are started in operation by pushing a switch 722. This completes a circuit to relay 724 closing its normally open contact 724C to seal it in and also closing contacts 724C1, 724C2 and 724C3 to start the motor 540. This feeds a container C into position between stops 552 and 554. Contact 724C4 will also close. When container C is properly positioned on angles 546 directly above platform 558 and below platen assembly 562 switch 654 will close. Relay coil 726 will then be energized when the conveyor 4 stops closing its contacts 186C. Energization of relay coil 726 closes its contact 726C, thus completing a circuit to solenoid 710S to cause fluid to flow through conduit 712 to raise the hoist 556. As the hoist rises it lifts the bundle of sheets from conveyor 4 until it receives the container C from the angles 546. Continued upward movement of hoist 556 moves the bundle and container thereon upwardly until they contact the platen assembly 562 and move it upwardly until the vertical member 568 actuates switch 718. This opens switch contact 718C to deenergize relay 726, thus stopping movement of the hoist. Contact 718C1 also closes, thus energizing relay coil 728. Energization of relay coil 728 closes contact 728C to seal it in and also closes contact 728C1 to complete a circuit through solenoid 656S to operate valve 656, thus causing center motors 580 and 580' to rotate plates 582 and 582' from their horizontal position downwardly to the vertical position shown in FIGURE 20. This causes side flaps C2 and side tabs C3 to move from a horizontal to a vertical position with the side flaps against the sides of the bundle. This operation closes switches 670 and 670' to complete a circuit through solenoid 662S, thus operating valve 662 to cause fluid to flow to the outer motors 580' to rotate plate 584' from its horizontal position downwardly to a vertical position. During this movement angles 590' which are spaced from the corners of the bundle engage the adjacent side tabs C3 and fold them inwardly adjacent the ends of the bundle. Completion of this operation closes switch 676' to complete a circuit through solenoid 678'S, thus causing hydraulic motors 592' to move the angles 590' toward the corners of the bundle and fold the side tabs C3 against the bundle. When this operation is completed switches 694 and 696 are closed, thus energizing solenoid 662'S to actuate valve 662' to cause fluid to flow to the outer motors 580' to rotate plates 584 from a horizontal position downwardly to a vertical position. During this movement angles 590 engage side tabs C3 at the opposite side of the bundle and fold them inwardly adjacent the ends of the bundle. Completion of this operation closes switch 676, thus energizing solenoid 678S causing motors 592 to move the angles 590 toward the corners of the bundle and fold side tabs C3 against the bundle. Vertical corner angles VA as shown in the above mentioned application have previously been positioned against angles 590 and 590' and held in place by means of magnets 594. Thus when the side tabs C3 are folded the corner angles VA are set in position. The parts are later retracted to their original position as explained hereinafter with the piston rods 598 of cylinders 596 preventing angles VA from leaving the bundle. When the side tabs are folded into position the switches 686 and 688 are closed to energize relay coil 730, thus closing its contact 730C to energize solenoid 710S to raise the hoist 556 until it contacts switch 720 which is approximately four inches above switch 718. Closing of switch 720 completes a circuit through relay 732 to close its contacts 732C and 732C1. Closing of contact 732C energizes solenoid 734S which operates valves 734 to supply fluid to motors 604, thus causing the rollers 608 to move toward each other and bend the flaps C4 against the ends of the bundle until they finally cause the tuck ends C5 to bend under the platform P as shown in FIGURE 22. At this time switches 704 and 706 are actuated. This opens switch contacts 704C and 706C to deenergize relay coil 730, thus stopping the hoist and also closes switch contacts 704C1 and 706C1, thus completing a circuit to time delay relay coil 736 and also completing a circuit through solenoid 738S to operate valve 738 so as to supply fluid to ejector cylinder 596 to prevent the angles VA from leaving the bundle. The operator then positions a barge or lower horizontal angle BA in one of the support angles 638 and moves the carriage 612 toward the bundle, the carriage being rotated so that one end of angle BA approaches the bundle before the other at the level of slots PS in the end of platform runners PR. The tuck end C5 at the first end of the bundle is lifted and the horizontal leg of angle BA placed thereunder. The movement of carriage 612 is continued and the tuck end C5 at the second end of the bundle is lifted and the horizontal leg of angle BA placed thereunder with the vertical leg of angle BA against the side of the bundle. The operator then actuates cylinder 622 to prevent longitudinal movement of carriage 612 after which he actuates cylinder 624 to lift angle BA into its final position. Spring clips SC or other retaining devices are then placed between angle BA and the bottom of slots PS to hold the angle BA in place. The operation is then repeated on the other side of the bundle to place the second barge angle BA in place. The hold and lift cylinders 622 and 624 are then retracted and the carriages 612 manually retracted. After a preset time delay the contacts 736C and 736C1 will open to deenergize solenoids 656S, 662S, 678'S, 662'S, 678S and 734S and contacts 736C2 and 736C3 will close to energize solenoids 656S1, 662S1, 662'S1, 738S and 738S1 which operate their respective valves to return the side flap folding device, side tab folding device and vertical angle ejector to normal position. When the side flap folding devices have returned to normal position switches 672 and 672' will be closed, thus energizing solenoids 678'S1 and 678S1 which actuate their respective valves to return the side tab closing devices to normal position. Returning of these closing devices to normal position actuates switches 692, 698, 684 and 690, thus completing a circuit through solenoid 734S1 to operate valve 734 to return the bottom tab folding devices to normal position. This closes switches 702 and 708 to complete a circuit through solenoid 710S1 to operate valve 710 to lower the hoist 556 to the bottom limit switch 716. Actuation of switch 716 opens its contact 716C to deenergize solenoid 710S1. Actuation of switch 716 also closes switch contact 716C1 which completes a circuit through solenoid 642S which actuates valve 642 which moves the pusher bar 522 forward in the direction of travel of the conveyor 4, thus feeding a container C onto the angles 546 and closing switch 654. When the pusher bar 522 reaches its forward limit, switch 652 is actuated closing its contacts 652C and 652C1 and opening its contact 652C2. Closing of contact 652C energizes relay coil 740 closing its contacts 740C and 740C1. Closing of switch contact 652C1 completes circuits through relay coil 742 and solenoid 642S1 which operates valve 642 to cause the pusher bar 522 to return to its rearward position. When the pusher returns to its rearward or normal position, switch contact 652C will open but relay coil 740 will remain energized and relay coil 744 will become energized since switch contact 650C will close. Solenoid 642S will be deenergized because contact 744C will open. Opening of switch contact 650C1 will deenergize solenoid 642S1 so that only one complete cycle of the pusher bar is made. When the packaging conveyor 4 starts moving contact 186C will open, thus resetting the circuits. The feed roll motor 540 may be stopped by means of push button switch 746.

*Horizontal strapping station*

Horizontal strapping is applied to the bundle at station No. 6. The apparatus shown in FIGURES 31 to 33 includes a framework 800 which spans the conveyor 4 and is provided with vertical tracks 802 for a wheeled horizontal frame or carriage 804. The framework 800 carries suitable mechanism 806 attached to opposite ends of the carriage 804 and driven from a motor 808 so as to raise and lower the carriage 804. Any suitable mechanism may be provided for this purpose. The mechanism shown is a chain drive. Mounted on the carriage 804 is the strapping mechanism which may be any standard strapping mechanism similar to that shown in the patents to Leslie et al. No. 2,707,429 and No. 2,707,430, dated May 3, 1955. Details of this mechanism will not be shown nor described since it forms no part of the present invention. In general the strapping machine comprises a reel 810, a strapping head 814 and strapping chute 816 which extends around the bundle. The reel 810 supports a coil of strapping 818. The strapping head 814 feeds the strap taken from the reel into the chute 816 surrounding the bundle until the chute 816 is filled. The head 814 then grips and holds the leading end of the strap and applies reverse feed to the strap in the chute so as to withdraw the excess length of strap out of the chute and so wrap the strap around the package. A predetermined tension is applied to the strap and a metal seal fastened thereto and crimped, after which the strap is cut to complete the cycle. This is done automatically through a control 820 forming part of the usual equipment. A hold down device 822 is mounted on the carriage 804 to bear on the bundle during strapping. Switches 824, 826, 828 and 830 are mounted on the framework 800 adjacent the carriage 804 and are adapted to be contacted thereby.

The operation of the device is as follows: The carriage 804 is normally in its raised position as shown, the switch 824 being actuated. When the packaging conveyor stops with the bundle in place at station No. 6 the contact 186C will close, thus energizing relay coil 832 to close its contacts 832C, 832C1 and 832C2, thus energizing motor 808 in a lowering direction. When the carriage 804 contacts switch 830 it will actuate the same and close switch contacts 830C and 830C1. Closing of contact 830C energizes relay coil 834 to close its contact 834C and open its contact 834C1 to deenergize motor 808. Closing of switch contact 830C1 energizes time delay relay coil 836 which, after the motor 808 stops, closes its contacts 836C, 836C1 and 836C3 and opens its contact 836C2. Closing of contacts 836C completes a circuit through time delay relay coil 838. Closing of contact 836C3 completes a circuit to control 820 to initiate the strapping cycle. After a time delay, which represents the time required to complete the strapping operation, contact 838C opens thus deenergizing relay coil 836. Closing of contacts 836C1 energizes relay coil 840 which opens its contact 840C and closes its contacts 840C1 and 840C2. Closing of contact 840C2 energizes relay coil 842. The only time this occurs is at the completion of a strapping cycle so that operation of relay 842 represents completion of a strapping cycle. Closing of contact 842C energizes relay coil 844 closing its contacts 844C and 844C1. Closing of contacts 844C1 energizes relay coil 846, thus closing its contacts 846C, 846C1 and 846C2, thus energizing motor 808 to cause it to operate in the direction to raise carriage 804. It also opens its contact 846C3 to deenergize the strapping circuit and reset all relays therein. The carriage 804 rises until it contacts switch 828. Actuation of switch 828 closes its contacts 828C and 828C1. Closing of contact 828C energizes relay coil 848 closing its contacts 848C and 848C2 and opening contact 848C1. Opening of contact 848C1 deenergizes relay coil 850, thus opening its contacts 850C and 850C1. Opening of contact 850C1 deenergizes relay coil 846, thus deenergizing motor 808. Closing of switch contact 828C1 completes a circuit to relay coil 836 thus initiating the strapping cycle as described above to place a second strap around the bundle. At the completion of the strapping cycle relay 842 will be energized closing its contacts 842C, 842C1 and 842C2. Closing of contact 842C1 energizes relay coil 852 to close its contacts 852C and 852C1. Closing of contact 852C1 energizes relay coil 846 to cause the motor 808 to operate in a direction to raise the carriage 804. During operation of the motor 808 the strapping relays are reset as described above. When the carriage 804 rises to a position where it actuates switch 826, switch contacts 826C and 826C1 will close. Closing of switch contact 826C energizes relay coil 854 which in turn closes its contacts 854C and 854C1 and opens its contact 854C2. Opening of contacts 854C2 deenergizes relay coil 852 to cause the motor to stop. Closing of switch contact 826C1 energizes relay coil 836 to initiate the strapping cycle to apply a third strap around the bundle. When the strapping cycle is completed the relay coil 842 will be energized to cause the motor 808 to operate in the raise direction and the carriage 804 will rise until it actuates switch 824. Actuation of switch 824 opens its contact 824C and closes contact 824C1 in the permissive circuit for the conveyor 4. Contact 824C deenergizes relay coil 844 to stop the motor 808. When the packaging conveyor 4 starts to move switch contact 186C will open resetting all the circuits.

*Vertical strapping station*

Vertical strapping is applied to the bundle at station No. 7 by the apparatus shown in FIGURES 34 and 35. At this station three strapping machines similar to the strapping machines at station No. 6 as described above are arranged to apply three vertical straps to the bundle simultaneously. Each machine consists of a reel 856 for carrying a coil of strapping 858, a strapping head 860, a strap chute 862 and control 864 for controlling the strapping cycle of the machine. Mechanism 866 and 868 may be provided for adjusting the position of the end machines for different size bundles. Air cylinders 870 are provided for moving the machines toward the bundle. The strap chutes 862 are interrupted at their lower end to provide for passage of the strap over the conveyor chain. During conveyor operation each of the chutes 862 is lowered by means of a cylinder 872 to avoid interference with the runners of the platform. These last named movements may be started by the operator or they may be incorporated in the control 864. When the packaging conveyor 4 stops contact 186C will close which energizes relay coils 874, 876, 878 and 880. Energization of relays 874, 876, 878 closes their contacts 874C, 876C and 878C completing circuits to the controls 864, thus initiating the strapping cycles of each of the three strapping machines. Coil 880 is a time delay coil and after a time representing the time required to complete a strapping cycle the contacts 880C open and contact 880C1 located in the permissive circuit for the packaging conveyor 4 closes. When the packaging conveyor 4 starts in operation the contacts 186C open to reset the circuit.

*Exit bundle transfer*

The monorail or exit bundle transfer 10 shown in FIGURES 36 to 38 includes a beam 52′ supported by columns 54′, a motorized trolley and hoist 56′ mounted on the beam 52′ and a sheet lifter 60′ carried by the hoist 56′. The construction and operation of these parts are the same as the corresponding parts of the entry transfer except that the roller assembly 58 is omitted and the lifter 60′ has lifting angles 62′ but no centering arm 64. No squaring stop is used in conjunction with the exit transfer 10.

Supported from beam 52′ in the path of movement of trolley 56′ are switches 890, 891, 892 and 893. Switch 890 has normally open contacts 890C and 890C1 and normally closed contact 890C2 and is operable by a cam 134′ mounted on trolley 56′. Contact 890C1 is in the permissive circuit for the packaging conveyor. (FIGURE 1.) Switch 891 will open when contacted by cam 134′ moving to the left as seen in FIGURE 36 and close when contacted by cam 134′ moving to the right. Switch 892 operates the reverse of switch 891. Switch 893 has normally open contacts 893C and 893C1 and normally closed contact 893C2. A top limit switch 894 is mounted on trolley 56′ and is operated by a cam 138′ mounted on sheet lifter 60′. The switch 894 has normally open contacts 894C, 894C1 and 894C2 and normally closed contacts 894C3 and 894C4. Contact 894C2 is in the permissive circuit for the packaging conveyor and is mounted in parallel with contact 890C1. A switch 895 is mounted in fixed relationship above conveyor 4 adjacent the path of travel of sheet lifter 60′. The switch 895 has normally open contact 895C and normally closed contact 895C1. Switches 896 and 897 are mounted on the sheet lifter 60′, one on the outboard side of each of the jaws 62′. Switch 896 has normally open contact 896C and normally closed contact 896C1. Switch 897 has normally open contact 897C and a normally closed contact 897C1. A switch 898 is mounted on one of the jaws 62′ and a switch 899 on the other jaw 62′. Switch 898 has normally open contacts 898C and 898C1, and normally closed contacts 898C2 and 898C3. Switch 899 has a normally open contact 899C and a normally closed contact 899C1. A switch 900 is located on the bottom of one of the jaws 62′, and a switch 901 on the bottom of the other jaw 62′. Switch 900 has a normally open contact 900C and a normally closed contact 900C1. Switch 901 has a normally open contact 901C and a normally closed contact 901C1. A switch 902 is mounted adjacent the packaging conveyor 4. This switch is open when a package is on the conveyor 4 at station 9 and prevents movement of the conveyor 4.

A relay coil 903 is mounted in series with packaging conveyor permissive switch contact 186C and contacts 893C and 895C1. The relay coil 903 operates a normally open contact 903C. A relay coil 904 is mounted in series with contacts 895C and 898C2, all of which are connected in parallel with relay coil 903 and contact 895C1. Contact 899C1 is mounted in parallel with contact 898C2. Relay coil 904 has four normally open contacts 904C, 904C1, 904C2 and 904C3. A relay coil 905 is mounted in series with contacts 894C3, 898C and 899C, all of which are mounted in parallel with relay coils 903 and 904. Coil 905 operates a normally open contact 905C. A relay coil 906 is mounted in series with contacts 890C2, 894C and 898C1. Coil 906 operates normally open contacts 906C, 906C1, 906C2 and 906C3. A relay coil 907 is mounted in series with contacts 891C and 906C. The coil 907 operates a normally open contact 907C. A relay coil 908 is mounted in series with contacts 893C2, 894C1 and 898C3. The coil 908 operates normally open contacts 908C, 908C1, 908C2 and 908C3. Contacts 908C and 892C are mounted in parallel with contacts 906C and 891C.

A relay coil 909 is mounted in series with contacts 890C and 900C. Contact 901C is mounted in parallel with contact 900C. Relay coil 909 operates normally open contact 909C. A relay coil 910 is mounted in series with contacts 896C1, 901C1 and 900C1. Contact 897C1 is mounted in parallel with 896C1. Relay coil 910 operates normally open contacts 910C, 910C1, 910C2 and 910C3. A relay coil 911 is mounted in series with contacts 896C, 897C and 894C4, all of which are connected in parallel with relay coils 909 and 910. Relay coil 911 operates normally open contacts 911C, 911C1, 911C2 and 911C3, and normally closed contacts 911C4, 911C5 and 911C6. A relay coil 912 is mounted in series with contact 911C and has normally open contacts 912C, 912C1, 912C2 and 912C3. Contact 912C is mounted in parallel with contact 911C. A relay coil 913 is mounted in series with contacts 911C4 and 912C1. Relay coil 913 operates normally open contacts 913C, 913C1 and 913C2. Contact 913C is mounted in parallel with contacts 911C4 and 912C1. Relay coil 914 is mounted in series with contacts 911C1, 912C2 and 913C1. Relay coil 914 operates normally open contacts 914C, 914C1, 914C2 and 914C3. Contact 914C is mounted in parallel with contacts 911C1, 912C2 and 913C1. A relay coil 915 is mounted in series with contacts 911C5 and 914C1. Relay coil 915 operates normally open contacts 915C, 915C1 and 915C2. Contact 915C is mounted in parallel with contacts 911C5 and 914C1. A relay coil 916 is mounted in series with contacts 911C2, 914C2 and 915C1. Coil 916 operates normally open contacts 916C, 916C1 and 916C2. Contact 916C is mounted in parallel with contacts 911C2, 914C2 and 915C1. A relay coil 917 is mounted in series with contacts 911C6 and 916C1. Coil 917 operates normally open contacts 917C and 917C1.

A relay coil 918 is mounted in series with a switch 919, contact 893C1 and a selector switch 920. Contacts 912C3, 913C2, 914C3, 915C2, 916C2 and 917C1 are mounted in circuit with selector switch 920. Coil 918 operates normally open contacts 918C and 918C1. Contact 918C is mounted in parallel with contact 893C1 and selector switch 920. A relay coil 921 is mounted in series with contact 918C1. Coil 921 has normally open contacts 921C, 921C1, 921C2 and 921C3, and normally closed contact 921C4. Contact 921C and switch 922 are mounted in parallel with contact 918C1.

Contact 921C4 controls the flow of current to relay coils 909, 910, 911, 912, 913, 914, 915, 916 and 917.

A solenoid 923S is mounted in parallel with relay coil 921. Solenoid 923S operates brake 923 for conveyor motor 32. A relay coil 924 is mounted in series with contact 903C and operates normally open contacts 924C, 924C1 and 924C2. Contact 909C is mounted in parallel with contact 903C. A relay coil 925 is mounted in parallel with relay coil 924 and has a normally open contact 925C. A relay coil 926 is mounted in series with contact 905C and has normally open contacts 926C, 926C1 and 926C2. Contact 911C3 is mounted in parallel with contact 905C. A relay coil 927 is mounted in parallel with coil 926 and has a normally open contact 927C.

Solenoid 928S is mounted in series with contact 925C which is mounted in parallel with contact 927C. Solenoid 928S operates brake 928 for lifter motor 61'. Solenoid 929S is mounted in series with contact 904C which is mounted in parallel with contact 910C. Solenoid 929S operates brake 929 of jaw motor 63'. Solenoid 930S is mounted in series with contact 906C1 which is mounted in parallel with contact 908C1. Solenoid 930S operates brake 930 for trolley motor 57'.

Contacts 921C1, 921C2 and 921C3 control the operation of exit conveyor motor 32. A cam 931 is driven from motor 32 and controls the operation of switches 919 and 922.

A generator 932 supplies current to trolley motor 57' through contacts 906C2, 906C3, 908C2 and 908C3. Current is supplied to field 932F of generator 932 through contact 907C. A rectifier 933 is mounted across the field 932F.

Contacts 924C, 924C1, 924C2, 926C, 926C1 and 926C2 control the operation of lifter motor 61'. Contacts 904C1, 904C2, 904C3, 910C1, 910C2 and 910C3 control the operation of jaw motor 63'.

Contacts 890C1 and 894C2 are mounted in parallel in the permissive circuit for the packaging conveyor.

The operation of the discharge transfer and conveyor 8 is as follows: When the packaging conveyor 4 stops, contact 186C closes and when the trolley 56' is above the packaging conveyor 4 so that switch contact 893C is closed, the relay 903 will be energized. This closes its contact 903C to energize relay coil 925 closing contact 925C which completes a circuit to solenoid 928S to release brake 928. Closing of contact 903C also energizes relay coil 924 closing its contacts to energize motor 61' so as to lower the sheet lifter 60'.

When the sheet lifter 60' actuates the switch 895, it opens contact 895C1 to deenergize relay coil 903 and thus stop motor 61' and apply brake 928. Relay coil 904 is also energized through contact 895C, thus releasing brake 929 and energizing jaw motor 63' to move the jaws 62' inwardly.

When the switches 898 and 899 contact the sides of the bundle of sheets they are operated to open contacts 898C2 and 899C1, thus deenergizing relay coil 904 to open its contacts, which applies the brake 929 and stops the motor 63'. At the same time relay coil 905 is energized through contacts 898C and 899C. This will release brake 928 and energize motor 61' in the raise direction, thus moving the sheet lifter 60' upwardly with the bundle until cam 138' actuates switch 894 to open contact 894C3. This will deenergize relay coil 905 to open contact 905C, thus applying the brake 928 and deenergizing motor 61'. Relay coil 906 will also be energized through contacts 894C and 898C1, thus releasing brake 930, energizing generator field 932F, and closing contacts 906C2 and 906C3 to connect the generator to the motor 57'. Due to the time delay of the generator field, the voltage will build up gradually giving a smooth acceleration of the trolley motor 57'. When the trolley 56' reaches switch 891 it will open contact 891C to deenergize coil 907 so that the contact 907C will open to deenergize the generator field 932F which will decay through rectifier 933. Due to the field time delay the voltage will drop gradually giving a smooth deceleration. When the arm 134' of trolley 56' actuates switch 890 contact 890C2 will open to deenergize coil 906 to stop the motor 57' and apply brake 930. Relay coil 909 is also energized through contact 890C. This completes a circuit through relay coil 924 which closes its contacts 924C, 924C1 and 924C2 to energize lifter motor 61' in a direction to lower the sheet lifter 60'. At the same time brake 928 is released. When the bundle being lowered comes to rest on the discharge conveyor 8, the lifter 60' continues downwardly until switches 900 and 901 are free of the bundle. This opens contacts 900C and 901C to deenergize relay coil 909 to open contact 909C, thus stopping the lifter motor 61' and applying the brake 928. At the same time relay coil 910 is energized through contacts 900C1 and 901C1, which closes its contacts to release the brake 929 and energize jaw motor 63' in the opening direction. When the jaws 62' contact switches 896 and 897 they close contacts 896C and 897C to complete a circuit to relay coil 911. This closes contact 911C3 to energize relay coil 926 and solenoid 928S, thus releasing brake 928 and operating lifter motor 61' to raise the sheet lifter 60'.

When the lifter 60' reaches its top position, it actuates switch 894 to open contact 894C4 deenergizing coil 911 which in turn causes motor 61' to deenergize. Contact 894C1 closes to energize relay coil 908 which in turn functions to energize the generator field 932F and connect the trolley motor for travel toward the conveyor 4. The motor 57' accelerates as before and when switch 892 is actuated the generator field is deenergized and deceleration occurs as in the forward direction. When the switch 893 is actuated contact 893C opens to deenergize relay coil 908 opening its contacts so that the motor 57' is deenergized and the cycle completed.

The selector switch 920 determines whether packages are to be arranged on the discharge conveyor one, two or three high before the conveyor 8 advances. If only one package is to be placed on the discharge conveyor before it advances, selector switch 920 is placed with its arm in the No. 1 position. When a package is placed on the discharge conveyor, relay coil 911 is energized through contacts 921C4, 890C, 896C, 897C and 894C4. Energization of coil 911 closes contact 911C to energize coil 912 which locks itself in through contact 912C. Then when the lifter 60' actuates the switch 894 to open contact 894C4 the coil 911 is deenergized, thus closing its contact 911C4 and energizing coil 913 which seals itself in through contact 913C. Energization of coils 912 and 913 closes their contacts 912C3 and 913C2. Then when the trolley 56' actuates switch 893 the contact 893C1 will close and complete a circuit to relay coil 918, thus energizing relay coil 921 and solenoid 923S. This releases brake 923 and energizes motor 32 to move the discharge conveyor and rotate cam 931. After switch 922 is released by means of cam 931 it closes and coil 921 is sealed in through contact 921C. After the conveyor 8 is moved a predetermined amount, the cam 931 opens switch 922 to stop movement of the conveyor 8. Energization of coil 921 also opens contact 921C4, thus returning the circuits of coils 909 to 917, inclusive, to their normal position.

If two bundles are to be piled one on top of the other before conveyor 8 moves forwardly, the arm of the selector switch 920 is moved to the No. 2 position. Then when one bundle is placed on the conveyor to relay 918 will not be energized because contacts 914C3 and 915C2 are open. When a second bundle is placed on the conveyor 8 on top of the first bundle, relay coil 911 will again be energized which energizes coil 914 and seals itself in. When coil 911 is deenergized, coil 915 is energized. Energization of coils 914 and 915 closes their contacts 914C3 and 915C2 so that when the trolley 56' contacts switch 893 to close contact 893C1 a circuit will be completed to relay coil 918 to move the conveyor 8 in the manner described above.

If it is desired to place three bundles one on top of the other before moving the conveyor 8, the arm of the selector switch 920 is moved to the No. 3 position shown. Then when two bundles are on the conveyor, the motor 32 will not be energized since contacts 916C2 and 917C1 are open. Under these circumstances when relay coil 911 is energized for the third time, relay coil 916 will be energized and seal it self in. When relay coil 911 becomes deenergized, relay coil 917 will be energized and seal itself in. Energization of relay coils 916 and 917 closes their contacts 916C2 and 917C1 so that a circuit is completed through relay coil 918 when the trolley 56' contacts switch 893 to close contact 893C1. Energization of coil 918 causes the conveyor 8 to move in the manner described above.

*Packaging conveyor*

The conveyor motor 50 has a field 50F. As shown in FIGURE 1 power is supplied to the motor 50 by means of a generator 940 having a field 940F. Power is supplied to field 940F through voltage amplifier 941. A circuit 942 provides a reference voltage for a voltage regulating system consisting of generator 940 and amplifier 941. The circuit 942 includes a battery or other D.C. power source 943, resistors 944 and 945 and capacitor 946. A voltage sensitive relay coil 186 is connected across the generator 940. Relay coil 186 has eight normally open contacts 186C, one in each of the permissive circuits at the various stations described hereinbefore. The relay coil 186 also has a normally closed contact 186C1 which is arranged in series with a time delay relay coil 949. A cam 947 is connected to be driven by means of motor 50 and a normally closed switch 948 is actuated by means of the cam 947. Motor 50 is also connected to drive two generators 950 and 951. The generator 951 has a field 951F connected to the output of tachometer generator 950 which is of the permanent magnet type. The voltage output $e_T$ of generator 951 is such that there is a squared relationship between $e_T$ and its speed as shown in FIGURE 39. The motor 50 is also connected to drive Selsyn 952 which forms part of a position detector. The other parts of the position detector are a fixed Selsyn 953, a demodulator 954, a reactor 955 and a capacitor 956. A relay coil 957 is connected in series with switches and contacts 126C1, 144C2, 224, 430C1, 716C2, 824C1, 880C1, 890C1, 902, 948C and 958C. Switch contact 136C2 is connected in parallel with switch contact 126C1 and switch contact 894C2 is connected in parallel with switch contact 890C1. Relay coil 957 has normally open contacts 957C, 957C1 and 957C2 and normally closed contact 957C3. Contacts 957C and 957C1 are located in circuit 942. Contact 957C2 is connected in parallel with the permissive contacts of the circuits at the several stations. Normally open contact 949C is connected in parallel with switch contact 948C. A relay coil 958 is connected in series with contacts 948C1 and 957C3. The relay coil 958 operates normally closed contact 958C and normally open contacts 958C1 and 958C2. Contact 958C is mounted in series with contact 948C and contact 958C1 is mounted in parallel with contact 948C1. Contact 958C2 is arranged in the position regulator circuit.

The operation of the packaging line is as follows:

Assuming that there is a bundle of tin plate at each of the stations except station No. 9, the packaging conveyor 4 will not move until the permissive switches are closed. In the entry transfer the lifter 60 must be in its upper position so that contact 136C2 is closed or the trolley 56 must be over the entry conveyor so that the switch 126C1 is closed. Also, the switch 144C2 must be closed by reason of a bundle being at station No. 1. The scale at station No. 2 must be below the top of the conveyor 4 so that switch 224 will be closed. The turntable 364 at station No. 3 must be in its lowest position so that contact 430C1 will be closed and the hoist 556 at station No. 5 must be in its lowest position so that contact 716C2 will be closed. The carriage 804 at station No. 6 must be in its upper position so that contact 824C1 is closed and the trapping cycle at station No. 7 must be completed so that contact 880C1 is closed. Station No. 8 is an extra station which has no function at present. There must be no package resting on the conveyor at station No. 9 so that contact 902 will be closed. The lifter 60' must be in its upper position or trolley 56' must be above the exit conveyor 8 so that either one or both contacts 890C1 and 894C2 will be closed. When the foregoing has taken place relay coil 957 will be energized, thus closing its contacts 957C, 957C1 and 957C2 and opening contact 957C3. Closing of contacts 957C and 957C1 connects the output of circuit 942 to amplifier 941. When this occurs the voltage across circuit 942 builds up gradually and the voltage of generator 940 will build up correspondingly so as to provide a smooth acceleration of motor 50 and conveyor 4. When the conveyor cam 947 has made almost a complete revolution it will operate switch 948 opening contact 948C and closing contact 948C1. Opening of contact 948C deenergizes relay coil 957. During the time motor 50 is rotating the Selsyn 952 will be generating an A.C. voltage which will be converted to D.C. voltage by the standard demodulator 954 with the polarity of the direct current corresponding to the phasing of the alternating current. The reactor 955 and capacitor 956 act as a filter circuit to smooth out the ripples from the demodulator 954. The voltage $e_S$ from the demodulator 954 tries to match the voltage $e_T$ and the cam 947 is arranged to actuate the switch 948 at the point where $e_T$ is equal and opposite to $e_S$, this being on line Z—Z in FIGURE 40. Thus, when contacts 957C and 957C1 open and contact 958C2 closes the motor 50 will start decelerating. As it decelerates the voltage $e_T$ decreases at a constant rate with the voltage $e_S$ also decreasing at the same rate. This deceleration continues until the voltage $e_S$ becomes zero and the conveyor 4 will stop. During the time the conveyor is running voltage sensitive relay coil 186 is energized so that all its contacts will be open. This prevents operation of the circuits at the various stations as discussed above. When the relay coil 186 is deenergized all of its contacts close and the operations on the bundles at the various stations can proceed in the manner set forth above. Closing of contact 186C1 energizes time delay relay coil 949. After a preset time which is sufficient to permit some of the permissive contacts in the circuit to relay coil 957 to open, contact 949C will close and set up the circuit for the next cycle. The operation is then repeated. The bundles must be arranged on the entry conveyor 2 from time to time so that a bundle will be on conveyor 4 at station No. 1 since otherwise the packaging conveyor 4 cannot move. Bundles will be removed from the end of the conveyor 8 as required.

*Package*

The completed bundle as shown in FIGURE 41 consists of a wooden platform P having runners PR. Three such runners are shown. The size of platform P is slightly smaller than the size of the tin plate S to be handled. The ends of the runners PR have cut-out upper portions PS therein. The waterproof paper R surrounds the sheets S and the cardboard container C surrounds the paper R. The vertical angles VA protect the corners of the sheets S and bottom angles BA protect the bottom of the bundles. The parts are held together by means of horizontal strapping 818 and vertical strapping 858.

While one embodiment of our invention has been shown and described it will be apparent that other adaptations and modifications may be made without departing from the scope of the following claims.

We claim:

1. Apparatus for packaging a bundle of tin plate including a platform on which the tin plate is mounted comprising a packaging conveyor having a plurality of stations therealong, means for delivering a bundle to the first station, means for removing a bundle from the last station, a wrapping station for wrapping waterproof paper around the bundle, a packaging station for wrapping a container around the waterproof paper on the bundle, said packaging station including a bundle hoist for lifting the bundle upwardly from said packaging conveyor, a platen above said hoist, means for feeding to a position above said hoist a container having a central section, a side flap on each side of said central section, a side tab on each end of said side flaps and an end flap at each end of said central section, means carried by said platen to fold said side flaps and side tabs against said package and means for folding said end flaps against said bundle, a horizontal strapping station for applying strapping around said container on said bundle, a vertical strapping station for applying strapping around said container on said bundle, means for moving said packaging conveyor when the operations on the bundle at each of said stations have been completed, and means for preventing operation of the apparatus at the various stations until the packaging conveyor is stopped.

2. Apparatus for packaging a bundle of tin plate including a platform on which the tin plate is mounted comprising an entry conveyor, a packaging conveyor having a plurality of stations therealong, an exit conveyor, an entry transfer for transferring bundles from the entry conveyor to the first station on the packaging conveyor, an exit transfer for transferring bundles from the last station on the packaging conveyor to the exit conveyor, a wrapping station for wrapping waterproof paper around the bundle, a packaging station for wrapping a container around the waterproof paper on the bundle, said packaging station including a bundle hoist for lifting the bundle upwardly from said packaging conveyor, a platen above said hoist, means for feeding to a position above said hoist a container having a central section, a side flap on each side of said central section, a side tab on each end of said side flaps and an end flap at each end of said central section, means carried by said platen to fold said side flaps and side tabs against said package and means for folding said end flaps against said bundle, a horizontal strapping station for applying strapping around said container on said bundle, a vertical strapping station for applying strapping around said container on said bundle, means for moving said packaging conveyor when the operations on the bundle at each of said stations have been completed, the exit transfer has removed the bundle from the last station and the entry transfer has positioned a bundle on the first station, and means for preventing operation of the apparatus at the various stations until the packaging conveyor is stopped.

3. Apparatus for packaging a bundle of tin plate including a platform on which the tin plate is mounted comprising means for delivering a bundle to the first station, means for removing a bundle from the last station, a scale at the second station for weighing the package, wrapping apparatus at the third station for wrapping waterproof paper around the bundle, packaging apparatus at a succeeding station, said packaging apparatus including a bundle hoist for lifting the bundle upwardly from said packaging conveyor, a platen above said hoist, means for feeding to a position above said hoist a container having a central section, a side flap on each side of said central section, a side tab on each end of said side flaps and an end flap at each end of said central section, means carried by said platen to fold said side flaps and side tabs against said package and means for folding said end flaps against said bundle, apparatus at succeeding stations for applying horizontal and vertical strapping around said container on said bundle, means for moving said packaging conveyor when the operations on the bundle at each of said stations have been completed, and means for preventing operation of the apparatus at the various stations until the packaging conveyor is stopped.

4. Apparatus for packaging a bundle of tin plate including a platform on which the tin plate is mounted comprising a packaging conveyor having a plurality of stations therealong, means for delivering a bundle to the first station, means for removing a bundle from the last station, a scale at the second station for weighing the package, wrapping apparatus at the third station for wrapping waterproof paper around the bundle, apparatus for feeding to a packaging station a container having a central section, a side flap on each side of said central section, a side tab on each end of said side flaps and an end flap at each end of said central section, packaging apparatus at said container wrapping station, said packaging apparatus including a bundle hoist for lifting the bundle upwardly from said packaging conveyor, a platen above said hoist, means carried by said platen to fold said side flaps and side tabs against said package and means for folding said end flaps against said bundle, apparatus at succeeding stations for applying horizontal and vertical strapping around said container on said bundle, means for moving said packaging conveyor when the operations on the bundle at each of said stations have been completed, and means for preventing operation of the apparatus at the various stations until the packaging conveyor is stopped.

5. Apparatus for packaging a bundle of tin plate including a platform on which the tin plate is mounted comprising a packaging conveyor having a plurality of stations therealong including a paper wrapping station, a packaging station, a horizontal strapping station and a vertical strapping station, means for delivering a bundle to the first station, means for removing a bundle from the last station, wrapping apparatus at the paper wrapping station for wrapping waterproof paper about the bundle, apparatus at the packaging station for wrapping a container around the waterproof paper on the bundle, said packaging apparatus including a bundle hoist for lifting the bundle upwardly from said packaging conveyor, a platen above said hoist, means for feeding to a position above said hoist a container having a central section, a side tab on each end of said side flaps and an end flap at each end of said central section, means carried by said platen to fold said side flaps and side tabs against said package and means for folding said end flaps against said bundle, apparatus at the horizontal strapping station for applying horizontal strapping around said container, apparatus at the vertical strapping station for applying vertical strapping around said container, means for moving said packaging conveyor when the operations on the bundle at each of said stations have been completed, and means for preventing operation of the apparatus at the various stations until the packaging conveyor is stopped.

6. Apparatus for packaging a bundle of tin plate including a platform on which the tin plate is mounted comprising a packaging conveyor having a plurality of stations therealong including a paper wrapping station, a packaging station, a horizontal strapping station and a vertical strapping station, an entry conveyor, an exit conveyor, an entry transfer for transferring bundles from the entry conveyor to the first station on the packaging conveyor, an exit transfer for transferring bundles from the last station on the packaging conveyor to the exit conveyor, wrapping apparatus at the paper wrapping station for wrapping waterproof paper about the bundle, apparatus at the packaging station for wrapping a container around the waterproof paper on the bundle, said packaging apparatus including a bundle hoist for lifting the bundle upwardly from said packaging conveyor, a platen above said hoist, means for feeding to a position above said hoist a container having a central section, a side flap on each side of said central section, a side tab on each end of said side flaps and an end flap at each end of said central section, means carried by said platen to fold said side flaps and side tabs against said package and means for folding said end flaps against said bundle, apparatus at the horizontal strapping station for applying horizontal strapping around said container, apparatus at the vertical strapping station for applying vertical strapping around said container, means for moving said packaging conveyor when the operations on the bundle at each of said stations have been completed, the exit transfer has removed the bundle from the last station and the entry transfer has positioned a bundle on the conveyor at the first station, and means for preventing operation of the apparatus at the various stations until the packaging conveyor is stopped.

7. Apparatus for packaging a bundle of tin plate including a platform on which the tin plate is mounted comprising an entry conveyor, a packaging conveyor having a plurality of stations therealong, an exit conveyor, an entry transfer for transferring bundles from the entry conveyor to the first station on the packaging conveyor, an exit transfer for transferring bundles from the last station on the packaging conveyor to the exit conveyor, a scale at the second station for weighing the package, wrapping apparatus at the third station for wrapping waterproof paper around the bundle, apparatus at the fourth station for feeding to the fifth station above the packaging conveyor a container having a central section, a side flap on each side of said central section, a side tab on each end of said side flaps and an end flap at each end of said central section, packaging apparatus at the fifth station including a bundle hoist for lifting a bundle upwardly from said packaging conveyor, a plate above said hoist, means carried by said platen to fold said side flaps and side tabs against said package, means for folding said end flaps against said bundle and means for positioning vertical corner angles and bottom corner angles against said bundle, apparatus at the sixth station for applying horizontal strapping around said container, apparatus at the seventh station for applying vertical strapping around said container, means for moving said packaging conveyor when the operations on the bundle at each of said stations have been completed, the exit transfer has removed the bundle from the last station and the entry transfer has positioned a bundle on the conveyor at the first station, and means for preventing operation of the apparatus at the various stations until the packaging conveyor is stopped.

8. Apparatus for wrapping a bundle with a container having a central section, a side flap on each side of said central section, a side tab on each end of said side flaps and an end flap at each end of said central section, which apparatus comprises a bundle hoist, a platen above said hoist, means for raising said hoist when a container is positioned directly thereabove, a pair of plates rotatably mounted on said platen one on each side thereof for movement about a horizontal axis, means for rotating said plates from a horizontal position downwardly to a vertical position to fold said side flaps and side tabs downwardly with the side flaps against the sides of the bundle, second plates pivotally mounted on said platen one adjacent each first plate, a flange adjacent each end of each of said second plates extending downwardly when said plates are horizontal, means for moving said second plates from said horizontal position to a vertical position to fold said downwardly bent side tabs against the ends of the bundle, a roller mounted adjacent each end of said platen, a lever for supporting each of said rollers and mounted for movement about a horizontal pivot having its axis at right angles to the axes of the pivots of said first and second plates, means for rotating said levers to bend said end flaps downwardly against the ends of said bundle, and means for returning said pates and hoist to their original positions.

9. Apparatus for wrapping a bundle with a container having a central section, a side flap on each side of said central section, a side tab on each end of said side flap and an end flap at each end of said central section, which apparatus comprises a bundle hoist, a platen above said hoist, means for raising said hoist when a container is positioned directly thereabove, a pair of plates rotatably mounted on said platen one on each side thereof for movement about a horizontal axis, means for rotating said plates from a horizontal position downwardly to a vertical position to fold said side flaps and side tabs downwardly with the side flaps against the sides of the bundle, second plates pivotally mounted on said platen one adjacent each first plate, a flange adjacent each end of each of said second plates extending downwardly when said plates are horizontal, means for holding a vertical corner angle against each of said flanges, means for moving said second plates from said horizontal position to a vertical position to fold said downwardly bent side tabs against the ends of the bundle and position said corner angles against the bundle, a roller mounted adjacent each end of said platen, a lever for supporting each of said rollers and mounted for movement about a horizontal pivot having its axis at right angles to the axes of the pivots of said first and second plates, means for rotating said levers to bend said end flaps downwardly against the ends of said bundle, and mean for returning said plates and hoist to their original positions.

10. Apparatus for wrapping a bundle with angles and a container having a central section, a side flap on each side of said central section, a side tab on each end of said side flap, an end flap at each end of said central section and tuck ends at the end of each end flap, which apparatus comprises a support for a pile of said containers, a bundle hoist, a vertically movable platen above said hoist, means for feeding a container from said pile to a position directly above said hoist, means for raising said hoist when a container is positioned directly thereabove, two horizontal plates mounted on said platen for movement transversely of said end flaps, a plate rotatably mounted on each of said horizontal plates for movement about a horizontal axis, means for rotating said last named plates from a horizontal position downwardly to a vertical position to fold said side flaps and side tabs downwardly with the side flaps against the sides of the bundle, third plates pivotally mounted on said first plates one adjacent each of said second plates, a flange adjacent each end of each of said third plates extending downwardly when said plate is horizontal, magnet means for holding a vertical corner angle against each of said flanges, means for moving said third plates from said horizontal position to a vertical position to fold said downwardly bent side tabs against the ends of the bundle and position said corner angles against the bundle, a roller mounted adjacent each end of said platen, a lever for supporting each of said rollers and mounted for movement about a horizontal pivot having its axis at right angles to the axes of the pivots of said second and third plates, means for rotating said levers to bend said end flaps downwardly against the ends of said bundle and said tuck ends under said bundle, a pair of carriages mounted adjacent said platen one at each side of the bundle, means for supporting a bottom horizontal angle on said carriage, means for moving said carriages toward said bundle to position said horizontal angles thereagainst, and means for returning said plates, carriages, and hoist to their original positions.

References Cited in the file of this patent

UNITED STATES PATENTS

| | | |
|---|---|---|
| 603,602 | Crowell | May 3, 1898 |
| 1,553,799 | Beam | Sept. 15, 1925 |
| 1,575,185 | Stenhouse | Mar. 2, 1926 |
| 1,624,203 | Aldrich et al. | Apr. 12, 1927 |
| 1,979,763 | Olson | Nov. 6, 1934 |
| 2,018,432 | Ackley | Oct. 22, 1935 |
| 2,084,515 | Van Buren | June 22, 1937 |
| 2,632,381 | Buckland | Mar. 24, 1953 |
| 2,675,658 | Crescenzo | Apr. 20, 1954 |
| 2,707,430 | Leslie et al. | May 3, 1955 |
| 2,803,930 | Schmidt | Aug. 27, 1957 |
| 2,847,120 | Miller | Aug. 12, 1958 |
| 2,897,643 | Byrd | Aug. 4, 1959 |

UNITED STATES PATENT OFFICE
CERTIFICATE OF CORRECTION

Patent No. 3,019,577                            February 6, 1962

Frank Slamar et al.

It is hereby certified that error appears in the above numbered patent requiring correction and that the said Letters Patent should read as corrected below.

Column 2, line 35, for "exist" read -- exit --; column 8, line 66, for "486C2" read -- 468C2 --; column 11, line 59, for "is" read -- in --; column 20, line 13, for "trapping" read -- strapping --; column 23, line 41, for "plate" read -- platen --; column 24, line 8, for "pates" read -- plates --.

Signed and sealed this 12th day of June 1962.

(SEAL)
Attest:

ERNEST W. SWIDER                                    DAVID L. LADD
Attesting Officer                                           Commissioner of Patents